(12) United States Patent
Mizrachi et al.

(10) Patent No.: US 12,275,396 B2
(45) Date of Patent: Apr. 15, 2025

(54) DEVICE AND METHOD FOR AUTOMATICALLY DETERMINING WEAR OF TIRES

(71) Applicant: TACTILE MOBILITY LTD., Haifa (IL)

(72) Inventors: Boaz Mizrachi, Sede Warburg (IL); Jacobus Daniel Potgieter, Netanya (IL); Stanislav Shapira, Nahariya (IL); Michael Zak, Haifa (IL); Michal Golan, Haifa (IL)

(73) Assignee: TACTILE MOBILITY LTD., Haifa (IL)

( * ) Notice: Subject to any disclaimer, the term of this patent is extended or adjusted under 35 U.S.C. 154(b) by 0 days.

(21) Appl. No.: 18/768,524

(22) Filed: Jul. 10, 2024

(65) Prior Publication Data

US 2025/0026337 A1 Jan. 23, 2025

Related U.S. Application Data

(63) Continuation-in-part of application No. 18/223,767, filed on Jul. 19, 2023, now Pat. No. 12,070,971.

(51) Int. Cl.
*B60W 30/08* (2012.01)
*B60W 10/04* (2006.01)
(Continued)

(52) U.S. Cl.
CPC ............ *B60W 30/08* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| 7,035,733 B1 | 4/2006 | Alwar et al. |
| 8,903,593 B1 | 12/2014 | Addepalli et al. |

(Continued)

FOREIGN PATENT DOCUMENTS

| CN | 105021384 | 4/2015 |
| DE | 102021111532 | 11/2022 |

(Continued)

OTHER PUBLICATIONS

"Sensata Technologies Announces Strategic Collaboration with NIRA Dynamics to Develop Tire Tread Depth Monitor Solution."; published Mar. 16, 2022; Sensata Technologies, Inc.

(Continued)

*Primary Examiner* — Matthew G Marini
(74) *Attorney, Agent, or Firm* — PEARL COHEN ZEDEK LATZER BARATZ LLP

(57) ABSTRACT

A method of determining a wear of a tire, which may include, using a computing device operating a processor: based on signals from one or more sensors of a vehicle, determining a plurality of tire parameters of a tire; based on at least a portion of the tire parameters, determining a normalized rolling radius of the tire, the normalized rolling radius being an effective rolling radius of the tire under a zero rotational speed, a zero load or both; and based on a change in the normalized rolling radius of the tire over a period of time, determining an average wear value of the tire.

16 Claims, 23 Drawing Sheets

(51) Int. Cl.
  *B60W 10/18* (2012.01)
  *B60W 10/20* (2006.01)
  *B60W 10/22* (2006.01)
  *G01M 17/02* (2006.01)

(52) U.S. Cl.
  CPC ............ *B60W 10/22* (2013.01); *G01M 17/02* (2013.01); *B60W 2530/20* (2013.01)

(56) References Cited

U.S. PATENT DOCUMENTS

| | | | |
|---|---|---|---|
| 9,571,449 | B2 | 2/2017 | Obradovisch |
| 11,472,235 | B2 * | 10/2022 | Carpenter ............ B60C 11/243 |
| 2004/0225423 | A1 | 11/2004 | Carlson et al. |
| 2010/0235039 | A1 | 9/2010 | Kajigai et al. |
| 2012/0109415 | A1 | 5/2012 | Nitta et al. |
| 2014/0309805 | A1 | 10/2014 | Ricci |
| 2015/0239298 | A1 | 8/2015 | Kretschmann et al. |
| 2016/0047648 | A1 | 2/2016 | Edge et al. |
| 2016/0114643 | A1 | 4/2016 | Anderson et al. |
| 2016/0244067 | A1 | 8/2016 | Hunt et al. |
| 2016/0258749 | A1 | 8/2016 | MacGougan et al. |
| 2017/0010174 | A1 | 1/2017 | Melen |
| 2017/0129498 | A1 | 5/2017 | Singh et al. |
| 2017/0363515 | A1 | 12/2017 | Poloni et al. |
| 2018/0134106 | A9 | 5/2018 | Anderson et al. |
| 2019/0329620 | A1 | 10/2019 | Rogers |
| 2020/0070589 | A1 | 3/2020 | Kuezl et al. |
| 2020/0282999 | A1 | 9/2020 | Mizrachi et al. |
| 2021/0008933 | A1 | 1/2021 | Kretschmann et al. |
| 2021/0302272 | A1 | 9/2021 | Wilgar et al. |
| 2022/0153070 | A1 | 5/2022 | Singuru et al. |
| 2023/0173851 | A1 | 6/2023 | Mizrachi et al. |
| 2023/0070044 | A1 | 9/2023 | Nishiyama et al. |

FOREIGN PATENT DOCUMENTS

| | | |
|---|---|---|
| EP | 2722202 | 4/2014 |
| EP | 2982521 | 2/2016 |
| EP | 3121034 | 1/2017 |
| JP | 2005145155 | 6/2005 |
| JP | 3702816 | 10/2005 |
| JP | 2009234454 | 10/2009 |
| JP | 2011016483 | 1/2011 |
| KR | 100784277 | 12/2007 |
| WO | WO 2019/049080 | 3/2019 |
| WO | WO 2021/176383 | 9/2021 |
| WO | WO 2022/026541 | 2/2022 |

OTHER PUBLICATIONS

"Every journey has a story to tell. Cyber™ Tyre read this for you"; published 2023; Pirelli & C. S.p.A—Pirelli Tyre S.p.A.

Drive Tesla Canada; "Your Tesla can now detect your tire wear and tread depth"; published Dec. 12, 2021, 16, 2022; Darryn Jonh; Software updates.

* cited by examiner

DEVICE AND METHOD FOR AUTOMATICALLY DETERMINING WEAR OF TIRES

CROSS REFERENCE TO RELATED APPLICATIONS

This application is a continuation in part of U.S. patent application Ser. No. 18/223,767 filed on Jul. 19, 2023, which is incorporated herein by reference in its entirety.

FIELD OF THE INVENTION

The present invention relates to the field of vehicle maintenance, and more particularly, methods and devices for automatically determining wear of tires.

BACKGROUND OF THE INVENTION

The function of tires in a vehicle is to provide contact between the vehicle and the road to support traction for acceleration, braking and steering. Tires can absorb shocks from bumps, potholes, and other irregularities in the road. Tires can support the weight of the vehicle and transfer the load from the vehicle's chassis to the road. Proper maintenance of tires including monitoring wear of tires is essential for safe and efficient driving. The wear of tires is typically determined in a garage or any other suitable facility by a mechanic professional by visual inspection and/or manual measurement of the depth of the tires' grooves. Determining tire wear through visual inspection and/or manual measurement can cause difficulty as vehicle owners and/or drivers may not know how to perform inspection and/or manual measurement and may not take the vehicle to the garage before tires wear out which can cause, for example, tires to burst during vehicle operation. Therefore, it can be desirable to determine tire wear in real-time and report that tire wear to a driver during operation.

SUMMARY OF THE INVENTION

Some embodiments of the present invention may provide a method of determining the wear of a tire, the method may include, using a computing device operating a processor: based on signals from one or more sensors of a vehicle, determining a plurality of tire parameters of a tire; based on at least a portion of the tire parameters, determining a normalized rolling radius of the tire, the normalized rolling radius being an effective rolling radius of the tire under a zero rotational speed, a zero load or both; and based on a change in the normalized rolling radius of the tire over a period of time, determining an average wear value of the tire.

In some embodiments, the method includes obtaining the signals from the one or more sensors during one or more rides of the vehicle.

In some embodiments, the tire parameters include a rotational speed of the tire, a pressure within the tire, a load acting on the tire, a torque acting on the tire and a slip of the tire.

In some embodiments, determining the normalized rolling radius of the tire includes providing at least a portion of the tire parameters as an input into a machine learning model.

In some embodiments, the method includes training the machine learning model based on training datasets including the tire parameters labeled with reference effective rolling radius values such that the machine learning model learns to normalize an effect of the tire parameters on the effective rolling radius of the tire.

In some embodiments, the method includes: based on at least a portion of the tire parameters, determining a normalized stiffness of the tire, the normalized stiffness of the tire being an effective stiffness of the tire under a zero torque; and based on the change in the normalized rolling radius of the tire and a change of the normalized stiffness of the tire over the period of time, determining at least one of an irregular wear type of the tire and an irregular wear value of the tire.

In some embodiments, determining the normalized stiffness of the tire includes providing at least a portion of the tire parameters as an input into a machine learning model.

In some embodiments, the method includes training the machine learning model based on training datasets including the tire parameters labeled with reference effective stiffness values such that the machine learning model learns to normalize an effect of the tire parameters on the effective stiffness of the tire.

In some embodiments, determining at least one of the irregular wear type of the tire and the irregular wear value of the tire includes providing at least a portion of the tire parameters as an input into a machine learning model.

In some embodiments, the method includes training the machine learning model based on training datasets including the changes of the normalized rolling radius and the normalized stiffness of the tire labeled with at least one of reference irregular wear types and reference irregular wear values.

In some embodiments, the method includes: based on the signals from the one or more sensors of the vehicle, determining at least one of an indication that the tire is imbalanced and an imbalance value of the tire; and further based on at least one of the indication that the tire is imbalanced and the imbalance value of the tire, determining at least one of the irregular wear type of the tire and the irregular wear value of the tire.

In some embodiments, the method includes: based on the signals from the one or more sensors of the vehicle, determining at least one of an indication that the tire is misaligned and a misalignment value of the tire; and further based on at least one of the indication that the tire is misaligned and the misalignment value of the tire, determining at least one of the irregular wear type of the tire and the irregular wear value of the tire.

In some embodiments, the method includes: based on a change in the normalized rolling radius of the tire, determining that the tire has been replaced with the new tire; and if it is determined that the tire has been replaced with the new tire, resetting the tire parameters determined for the tire.

In some embodiments, the method includes transmitting notifications indicative of the determined average wear value of the tire.

In some embodiments, the method includes: based on the determined average wear value of the tire, generating recommendations; and transmitting the recommendations.

Some embodiments of the present invention may provide a method of determining a wear of a tire, the method may include, using a computing device operating a processor: based on signals from one or more sensors of a vehicle, determining a plurality of tire parameters of a tire; based on at least a portion of the tire parameters, determining: a normalized rolling radius of the tire, the normalized rolling radius being an effective rolling radius of the tire under a zero rotational speed, a zero load or both, and a normalized stiffness of the tire, the normalized stiffness of the tire being an effective stiffness of the tire under a zero torque; and based on a change in the normalized rolling radius and a change in the normalized stiffness of the tire over a period of time, determining at least one of an irregular wear type of the tire and an irregular wear value of the tire.

In some embodiments, the method includes obtaining the signals from the one or more sensors during one or more rides of the vehicle.

In some embodiments, the tire parameters include a rotational speed of the tire, a pressure within the tire, a load acting on the tire, a torque acting on the tire and a slip of the tire.

In some embodiments, determining the normalized rolling radius and the normalized stiffness of the tire includes providing at least a portion of the tire parameters as an input into a machine learning model.

In some embodiments, the method includes training the machine learning model based on training datasets including the tire parameters labeled with reference effective rolling radius values and reference effective stiffness values such that the machine learning model learns to normalize an effect of the tire parameters on the effective rolling radius of the tire and the effective stiffness of the tire.

In some embodiments, the method includes determining at least one of the irregular wear type of the tire and the irregular wear value of the tire includes providing at least a portion of the tire parameters as an input into a machine learning model.

In some embodiments, the method includes training the machine learning model based on training datasets including the changes of the normalized rolling radius and the normalized stiffness of the tire labeled with at least one of reference irregular wear types and reference irregular wear values.

In some embodiments, the method includes: based on the signals from the one or more sensors of the vehicle, determining at least one of an indication that the tire is imbalanced and an imbalance value of the tire; and further based on at least one of the indication that the tire is imbalanced and the imbalance value of the tire, determining at least one of the irregular wear type of the tire and the irregular wear value of the tire.

In some embodiments, the method includes: based on the signals from the one or more sensors of the vehicle, determining at least one of an indication that the tire is misaligned and a misalignment value of the tire; and further based on at least one of the indication that the tire is misaligned and the misalignment value of the tire, determining at least one of the irregular wear type of the tire and the irregular wear value of the tire.

In some embodiments, the method includes: based on at least one of a change in the normalized rolling radius and a change of the normalized stiffness of the tire, determining that the tire has been replaced with the new tire; and if it is determined that the tire has been replaced with the new tire, resetting the tire parameters determined for the tire.

In some embodiments, the method includes transmitting notifications indicative of at least one of the irregular wear type of the tire and the irregular wear value of the tire.

In some embodiments, the method includes: based on at least one of the irregular wear type of the tire and the irregular wear value of the tire, generating recommendations; and transmitting the recommendations.

Some embodiments of the present invention may provide a method of determining a wear of a tire, the method may include, using a computing device operating a processor: based on signals obtained from one or more sensors of a vehicle during one or more rides of the vehicle, determining a plurality of tire parameters of a tire; based on at least a portion of the tire parameters, training a first machine learning model to normalize an effect of the tire parameters on an effective rolling radius and an effective stiffness of the tire; using the first machine learning model, based on at least a portion of the tire parameters, determining: a normalized rolling radius of the tire, the normalized rolling radius being an effective rolling radius of the tire under a zero rotational speed, a zero load or both, and a normalized stiffness of the tire, the normalized stiffness of the tire being an effective stiffness of the tire under a zero torque; and using a second machine learning model, based on a change in the normalized rolling radius and a change in the normalized stiffness of the tire over a period of time, determining at least one of an irregular wear type of the tire and an irregular wear value of the tire.

In some embodiments, the method includes training the second machine learning model based on training datasets including the changes of the normalized rolling radius and the normalized stiffness of the tire labeled with at least one of reference irregular wear types and reference irregular wear values.

In some embodiments, the method includes: based on the signals from the one or more sensors of the vehicle, determining at least one of: an indication that the tire is imbalanced, an imbalance value of the tire, an indication that the tire is misaligned and a misalignment value of the tire; and using the second machine learning model, based on at least one of the indication that the tire is imbalanced, the imbalance value of the tire, the indication that the tire is misaligned and the misalignment value of the tire, determining at least one of the irregular wear type of the tire and the irregular wear value of the tire.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout. In the accompanying drawings.

Figure 1A:
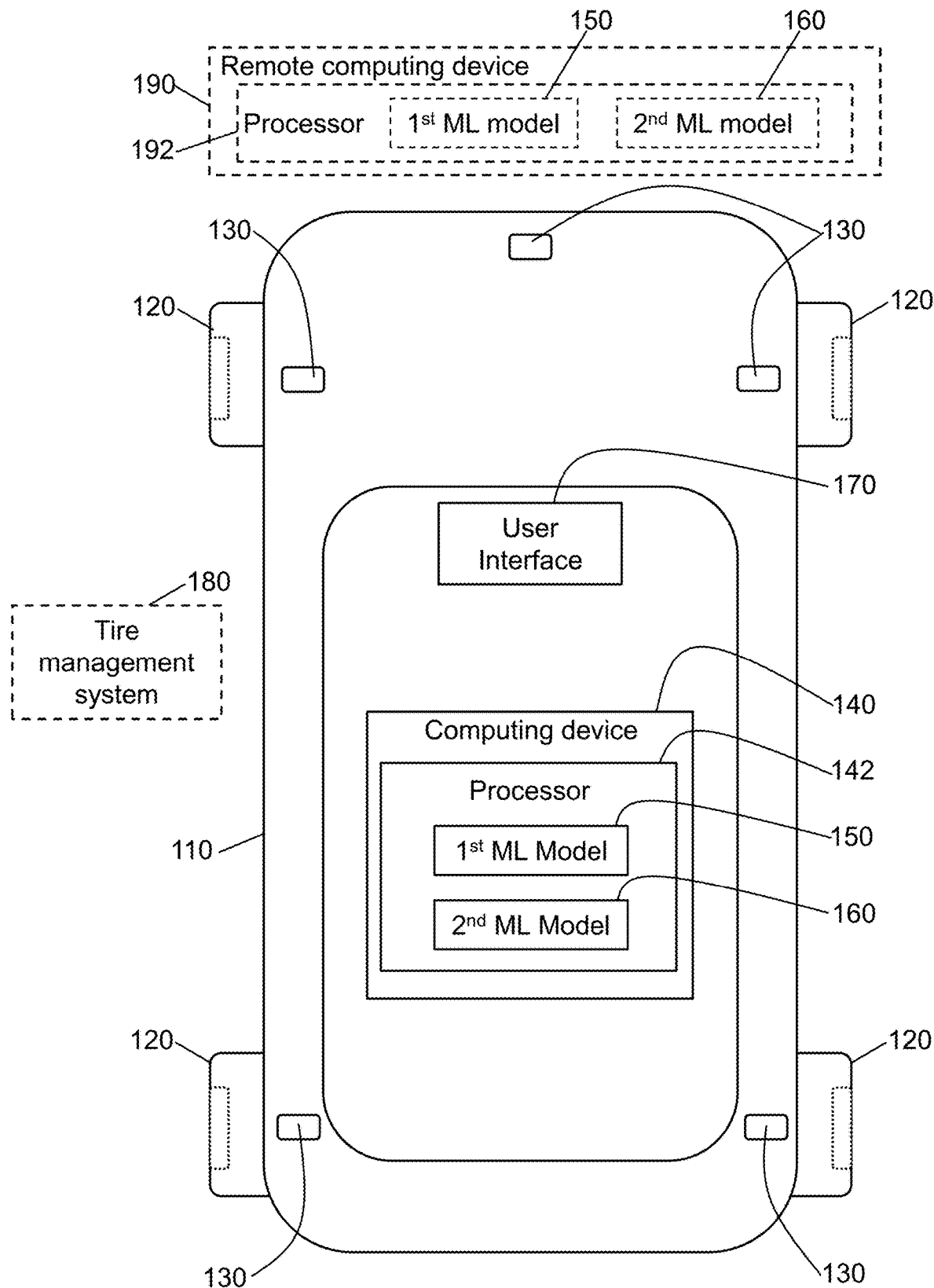
FIG. 1A is a schematic illustration of a vehicle including a computing device capable of determining wear of tires of the vehicle, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Proper maintenance of tires of a vehicle, including monitoring wear of tires, is essential for safe and efficient driving of the vehicle. Embodiments of the present invention may improve the maintenance of the tires of the vehicle by, for example, automatically determining the wear of the tires based on signals obtained from sensors of the vehicle during the ride of the vehicle on the road. The automatic determination may be performed in real time, for example during the ride of the vehicle on the road. The automatic determination may allow early detection of the wear (e.g., an average wear value, an irregular wear type and/or an irregular wear value) of the tires. Early detection of the wear of the tires may enhance safety and efficiency of the vehicle.

Reference is made to FIG. 1A, which is a schematic illustration of a vehicle 100 including a computing device 140 capable of determining wear of tires 120 of vehicle 100, according to some embodiments of the invention.

Vehicle 100 may include a chassis 110. Vehicle 100 may include a plurality of tires 120 (e.g., four tires 120 as show in FIG. 1 or any other suitable number of tires). Tires 120 may be coupled to chassis 110. Vehicle 100 may include a plurality of sensors 130. Sensors 130 may include wheel speed sensors, vehicle speed sensors, inertial sensors, geolocation sensors, pressure sensors, vibrational sensors, torque sensors and/or any other suitable sensors that can measure parameters of vehicle 100 and/or parameters of tires 120.

Vehicle 100 may include a computing device 140 (e.g., such as computing device 1100 described hereinbelow). Computing device 140 may be disposed on vehicle 140. Computing device 140 may include a processor 142. Processor 142 may receive signals from sensors 130. Based signals obtained by one or more sensors of sensors 130 during the ride (e.g., one or more rides) of vehicle 100, processor 142 may determine a plurality of tire parameters for each tire of tires 120. The tire parameters determined for each tire of tires 120 may include a load (e.g., a static load and/or a dynamic load) acting on the respective tire, a rotational speed of the respective tire, a pressure within the respective tire, a torque acting on the respective tire and/or a slip of the respective tire. In various embodiments, the tire parameters such as the rotation speed of the tire, the pressure within the tire, the torque acting on the tire may be directly determined (e.g., obtained) by processor 142 from the signals from the respective sensors of sensors 130 of the vehicle. In various embodiments, the slip of the tire and/or the load acting on the tire may be calculated by processor 142 based on tire parameters such as the rotation speed of the tire, the pressure within the tire, the torque acting on the tire), vehicle parameters (such as a weight of vehicle 100, geolocation of vehicle 100) and/or signals from the one or more sensors of sensors 130 of vehicle. In various embodiments, parameters that can be determined by processor 142 based on signals from one or more sensors of sensors 130 of vehicle 100 are described below with respect to FIG. 11.

Processor 142 may determine an average wear value, an irregular wire type and/or an irregular wear value of each tire of tires 120 based on at least a portion of the tire parameters determined for the respective tire (e.g., as described hereinbelow).

Figure 7A:
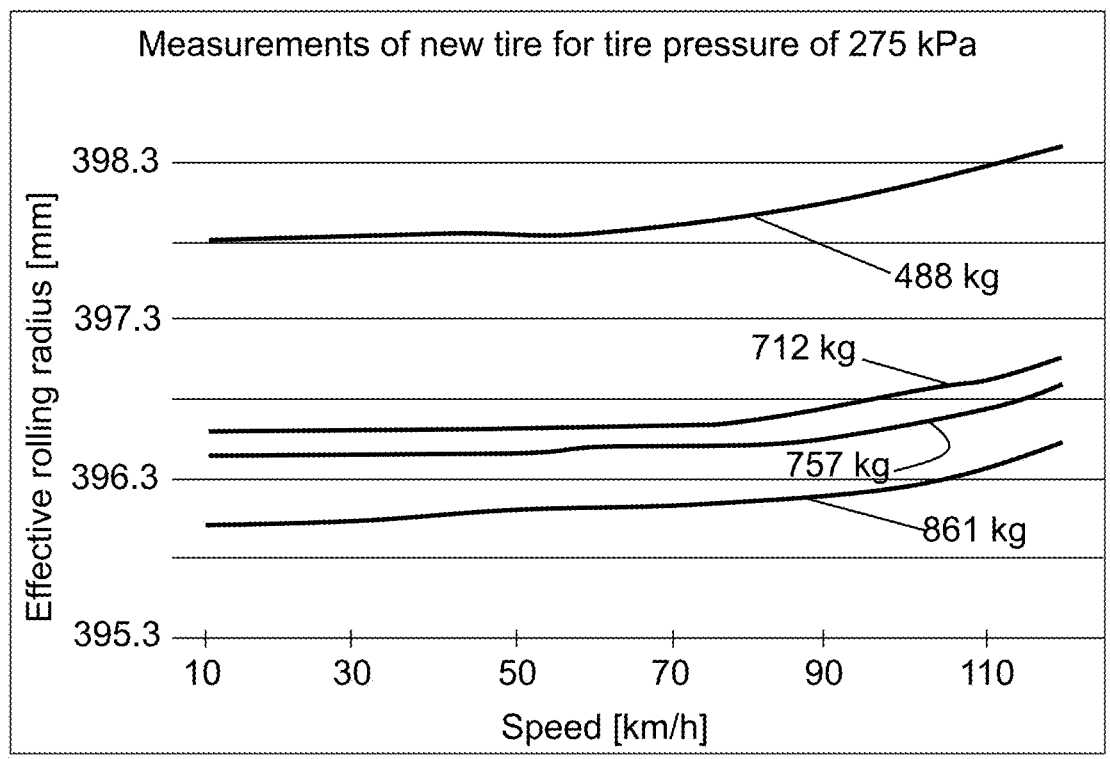
FIG. 7A is a graph showing the effect of the load of tire and the effect of the rotational speed of the tire on the effective rolling radius of the tire, according to some embodiments of the invention.
Figure 7B:
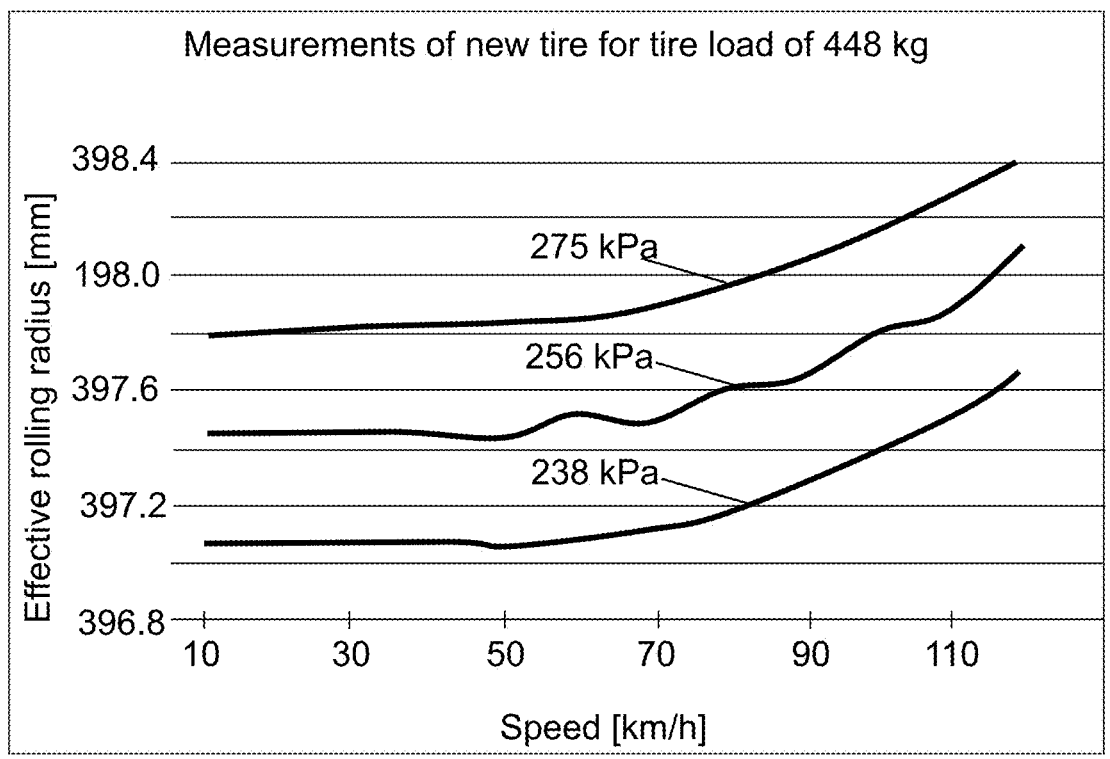
FIG. 7B is a graph showing the effect of the pressure of tire and the effect of the rotational speed of the tire on the effective rolling radius of the tire, according to some embodiments of the invention.

The effective rolling radius of each tire of tires 120 of vehicle 100, which is the effective rolling radius of the respective tire when the respective tire rotates and moves on the ground, may affect the wear of the respective tire. For example, the effective rolling radius of each tire of tires 120 may dictate the amount and/or the position of the grooves on the respective tire that contact the road, which may affect the wear of the respective tire. The effective radius of each tire of tires 120 may depend on various parameters such as a load acting on the respective tire, a rotational speed of the respective tire and/or a pressure within the respective tire. For example, the effect of the load acting on the tire and the effect of the rotational speed of the tire on the effective rolling radius of the tire is shown in FIG. 7A. In another example, the effect of pressure of the tire and the effect of the rotational speed of the tire on the effective rolling radius of the tire is shown in FIG. 7B. In order to determine the wear (e.g., the average wear value, the irregular wear type and/or the irregular wear value) of each tire of tires 120 based on the effective rolling radius of the respective tire, the effective rolling radius of the respective tire as it is under a zero speed and/or a zero load can be determined. In order to determine the effective rolling radius of each tire of tires 120 as it is under the zero speed and/or the zero load based on signals received from sensors 130 of vehicle 100 during the ride of vehicle 100, the effect of the parameters affecting the effective rolling radius of the respective tire can be taken into account (e.g., normalized) as described hereinbelow.

Processor 142 may determine a normalized rolling radius of each tire of tires 120 based on at least a portion of the tire parameters determined for the respective tire. The normalized rolling radius of each tire of tires 120 may be the effective rolling radius of the tire as it is at the zero speed and/or the zero load condition. Processor 142 may determine the normalized rolling radius for each tire of tires 120 by providing at least a portion of the tire parameters determined for the respective tire as an input to a first machine learning model 150 (e.g., as described below with respect to FIGS. 2A-2B). First machine learning model 150 may be trained to determine the normalized rolling radius of each tire of tires 120 based on at least a portion of the tire parameters determined for the respective tire (e.g., as described below with respect to FIG. 2C).

Processor 142 may determine the average wear value of each tire of tires 120 based on a change in the normalized rolling radius of the respective tire over a period of time. The average wear value determined for each tire of tires 120 may be indicative of the average wear of the grooves the respective tire. The greater the reduction of the normalized rolling radius of each tire of tires 120 over the period of time, the greater the average wear value of the respective tire. For example, the average wear value of each tire of tires 120 may be provided by:

(Average wear value)=(Normalized rolling radius at t1)−(Normalized rolling radius at t2).

Figure 10:
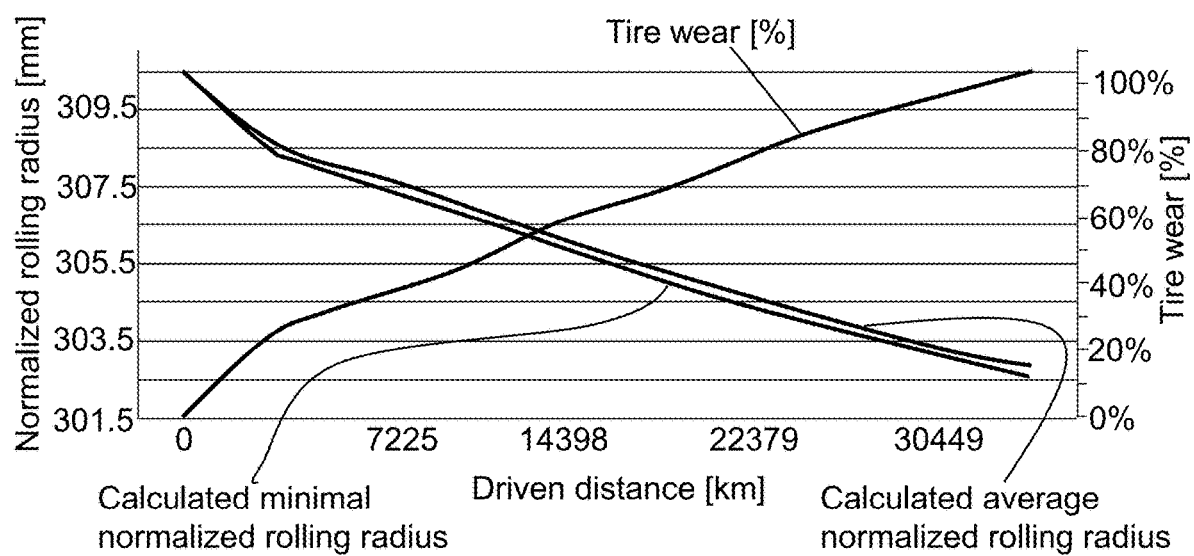
FIG. 10 is a graph showing the change of the normalized rolling radius and the wear of the tire as function of driven distance, according to some embodiments of the invention.

For example, the change in the normalized rolling radius of a tire as function of driven kilometers is shown in FIG. 10.

Figure 8A:
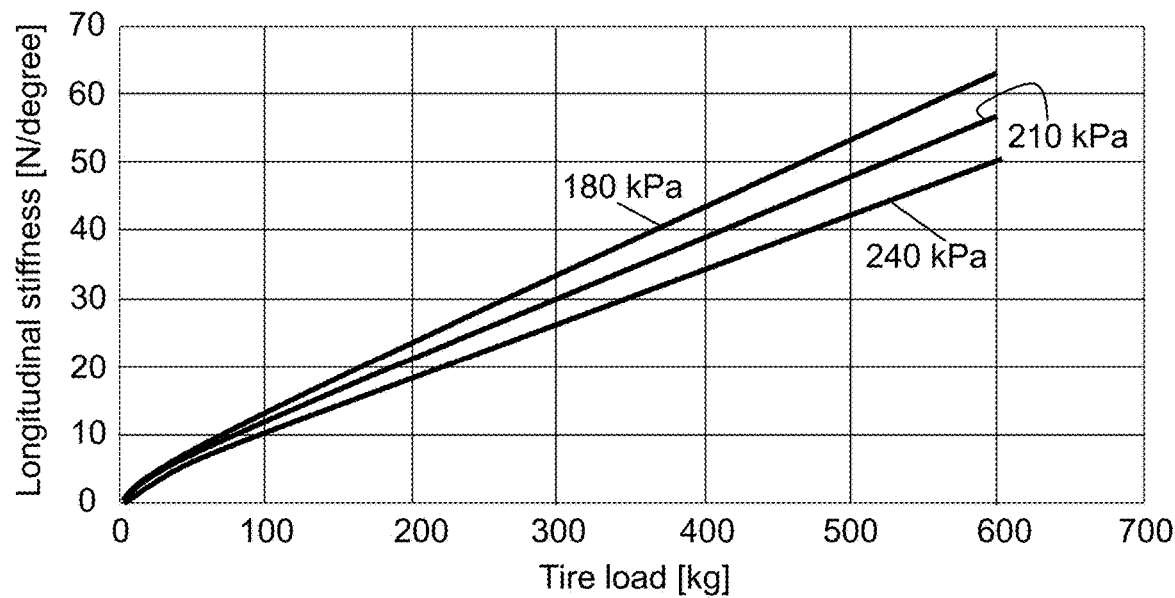
FIG. 8A is a graph showing the effect of the pressure of tire and the load of the tire on the effective longitudinal stiffness of the tire, according to some embodiments of the invention.
Figure 8B:
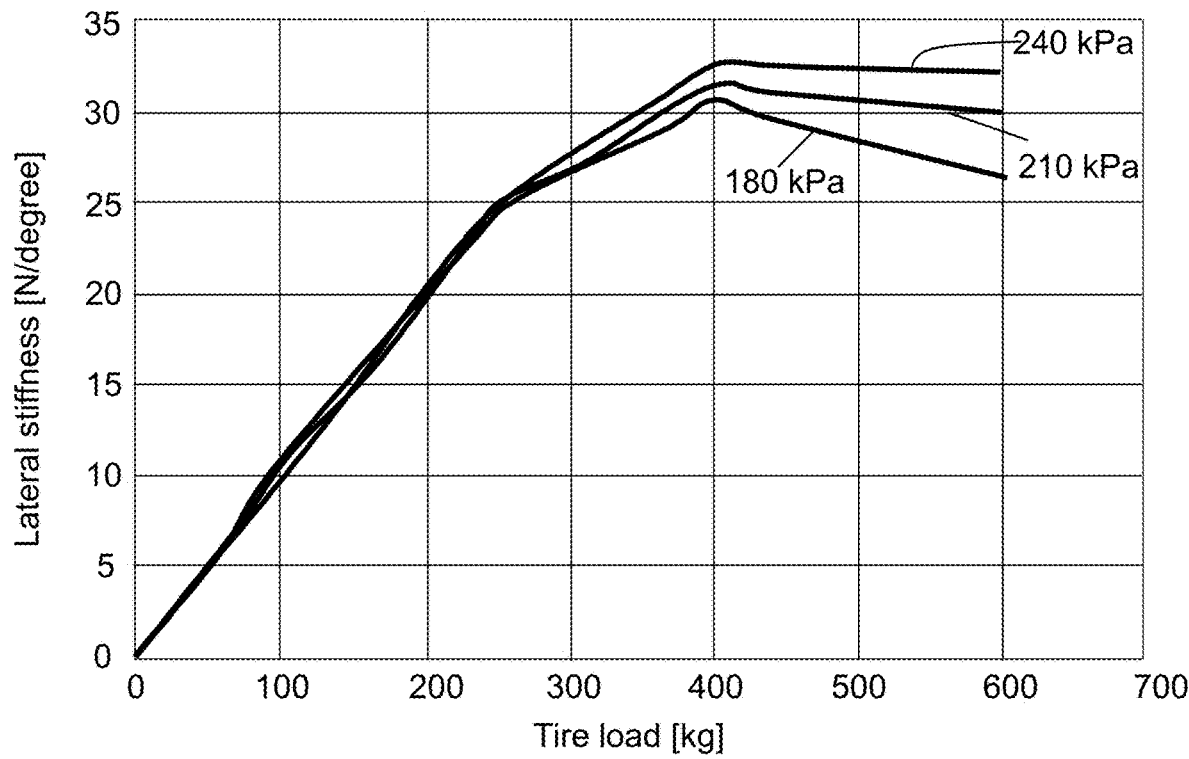
FIG. 8B is a graph showing the effect of the pressure of tire and the load of the tire on the effective lateral stiffness of the tire, according to some embodiments of the invention.

The effective stiffness of each tire of tires 120 of vehicle 100, which is a ratio of a force acting on the respective tire over a slip of the respective tire, may be indicative of the wear of the respective tire. The effective stiffness of each tire of tires 120 may depend on various parameters such as a load acting on the respective tire, a rotational speed of the respective tire, a pressure within the respective tire, a torque acting on the respective tire and/or a slip of the respective tire. For example, the effect of pressure of the tire and the effect of the load acting on the tire on the effective stiffness of the tire is shown in FIGS. 8A and 8B. In order to determine the wear (e.g., the irregular wear type and/or the irregular wear value) of each tire of tires 120 based on the effective stiffness of the respective tire, the effective stiffness of the respective tire as it is under a zero torque can be determined. In order to determine the effective stiffness of each tire of tires 120 as it is under the zero torque based on signals received from sensors 130 of vehicle 100 during the ride of vehicle 100, the effect of the parameters affecting the effective stiffness of the respective tire can be taken into account (e.g., normalized) as described hereinbelow.

Processor 142 may determine a normalized stiffness of each tire of tires 120 based on at least a portion of the tire parameters determined for the respective tire. The normalized stiffness determined for each tire of tires 120 may be the stiffness of the respective tire as it is under the zero torque condition. Processor 142 may determine the normalized stiffness of each tire of tires 120 by providing at least a portion of the tire parameters determined for the respective tire as an input to first machine learning model 150 (e.g., as described below with respect to FIGS. 2A-2B). First machine learning model 150 may be trained to determine the normalized stiffness of each tire of tires 120 based on at least a portion of the tire parameters determined for the respective tire (e.g., as described below with respect to FIG. 2C).

Processor 142 may determine the irregular wear type and/or the irregular wear value of each tire of tires 120 based on changes in the normalized rolling radius and in the normalized stiffness of the respective tire over a period of time. Processor 142 may determine the irregular wear type and/or the irregular wear value of each tire of tires 120 by providing the changes in the normalized stiffness and in the normalized rolling radius of the respective tire over the period of time as an input to a second machine learning model 160 (e.g., as described below with respect to FIG. 3A). Second machine learning model 160 may be trained to determine the irregular wear type and/or the irregular wear value of each tire of tires 120 based on the changes in the normalized stiffness and in the normalized rolling radius of the respective tire over the period of time (e.g., as described below with respect to FIG. 3B). Examples of different irregular wear types that may be determined by processor 142 according to some embodiments of the invention are shown in FIGS. 9A, 9B, 9C, 9D and 9E.

In some embodiments, processor 142 can determine the irregular wear type and/or the irregular ware value of each tire of the tires 120 based on signals from one or more sensors of sensors 130, processor 142 may determine whether or not one or more tires of tires 120 is imbalanced (e.g., as described below with respect to FIG. 15). If it is determined that the one or more tires of tires 120 is imbalanced, processor 142 may determine an imbalance value of the respective one or more tires. Processor 142 may further determine the irregular wear type and/or the irregular wear value of each tire of tires 120 based on the indication that the respective tire is imbalanced and/or based on the imbalance value of the respective tire. For example, the indication of imbalance and/or the imbalance value may be part of the input into second machine learning model 160 (e.g., as describe below with respect to FIG. 3A). Second machine learning model 160 may be trained to determine the irregular wear type and/or the irregular wear value of each tire of tires 120 further based on the indication of imbalance and/or the imbalance value of the respective tire (e.g., as described below with respect to FIG. 3B).

In another example, based on signals from one or more sensors of sensors 130, processor 142 may determine whether or not one or more tires of tires 120 is misaligned (e.g., as described below with respect to FIG. 13). If it is determined that the one or more tires of tires 120 is imbalanced, processor 142 may determine a misalignment value of the respective one or more tires. Processor 142 may further determine the irregular wear type and/or the irregular wear value of each tire of tires 120 based on the indication that the respective tire is misaligned and/or based on the misalignment type and/or based on the misalignment value of the respective tire. For example, the indication of misalignment and/or the misalignment type and/or the misalignment value of each tire of tires 120 may be part of the input into second machine learning model 160 (e.g., as described below with respect to FIG. 3A). Second machine learning model 160 may be trained to determine the irregular wear type and/or the irregular wear value of each tire of tires 120 further based on the indication of misalignment and/or the misalignment type and/or the misalignment value of the respective tire (e.g., as described below with respect to FIG. 3B).

Processor 142 may use methods other than machine learning methods to determine the wear (e.g., the average wear value, the irregular wear type and/or the irregular wear value) of tires 120 of vehicle 120. One example of a method of determining the wear of tires 120 of vehicle 120 is described below with respect to FIGS. 14A, 14B, 14C and 14D.

Based on the changes in the normalized rolling radius and/or in the normalized stiffness of each tire of tires 120, processor 142 may determine that the respective tire has been replaced with the new tire. If it is determined that the tire has been replaced, processor 142 may reset the tire parameters determined for the respective tire. Resetting the tire parameters for the replaced tire may be important to, for example, eliminate errors in wear determination. For example, a sudden change in the normalized rolling radius and/or in the normalized stiffness of the respective tire in a short period of time may be indicative of replacement of the respective tire. For example, a change of 1 mm in the normalized rolling radius and/or a change of 10% in the normalized stiffness of the tire within a period of time of a few minutes, a hour or a few hours may be indicative of replacement of the tire. The replacement of the respective tire may be verified by processor 142. For example, based on history of signals from one or more sensors of sensors 130, processor 142 may determine whether or not vehicle 100 was static for more than a predefined period of time prior to the detection of the sudden change in the normalized rolling radius and/or in the normalized stiffness of the respective tire (e.g., at least 5 minutes). If it is determined that vehicle 100 was static for more than the predefined period of time prior to the detection of the sudden change in the normalized rolling radius and/or in the normalized stiffness of the respective tire, the replacement of the respective tire may be verified.

Processor 142 may transmit notifications related to the determined wear (e.g., the average wear value, the irregular wear type and/or the irregular wear value) of tires 120 to the user of vehicle 100 such as driver and/or to any authorized third party such as vehicles fleet managers and/or to any suitable systems of vehicle 100. The notifications to the user may be transmitted using, for example, a user interface 170 such as screen or display disposed in vehicle 100 and/or in any other suitable way such as to a smartphone of the user. For example, the notifications may be transmitted if the determined wear exceeds a predefined threshold. In another example, the notifications may be periodically transmitted to the user and/or to any authorized third party (e.g., independently of whether or not the determined wear exceeds the predefined threshold).

The notifications may, for example, include recommendations. For example, if it is determined that the wear of a specific tire of tires 120 of vehicle 100 exceeds the predefined threshold, the notification may include a recommendation to replace that specific tire, rotate that specific tire on the rim, adjust the pressure within that specific tire, adjust alignment of wheels of vehicle 100, check an imbalance of that specific tire and/or of other tires and/or any other suitable recommendation related to tires 120 of vehicle 120 and/or maintenance thereof. In another example, the notifications may include driving-related recommendations. For example, if it is determined that the wear of one or more of tires 120 exceeds the predefined threshold, the notifications may include recommendations to drive at lower speeds, warnings to be aware of greater barking distances and/or any other suitable recommendations related to safety of driving vehicle 100.

Processor 142 may transmit notifications related to the determined wear (e.g., the average wear value, the irregular wear type and/or the irregular wear value) of tires 120 to a tire management system 180. Tire management system 180 may be managed by, for example, vehicles fleet manager and/or any other authorized person. Tire management system 180 may allow fleet managers to monitor the of the tires in the vehicle fleet in real-time. This may allow the fleet managers to identify potential issues before they become major problems, which can help improve performance and reduce downtime. Properly maintained tires may be important for ensuring safe driving conditions. Tire management system 180 may help fleet managers identify and address potential safety issues, such as underinflation or uneven wear, before they become a hazard on the road. Tire management systems 180 may help fleet managers to reduce costs associated with tire maintenance and replacement. By identifying potential issues early, managers can avoid costly repairs and replacements and extend the life of their tires. Tire management system 180 may help fleet managers ensure that their tires are properly inflated, which may result in significant fuel savings over time. Properly inflated tires may help improve fuel efficiency by reducing rolling resistance. Tire management system 180 may help fleet managers streamline their operations by providing real-time data on tire and performance. This may help managers make informed decisions about maintenance schedules and replacements, which can improve overall efficiency and productivity.

Signals obtained by sensors 130 of vehicle 100 may be transmitted to a processor 192 of a remote computing device 190. Processor 192 of remote computing device 190 may perform at least a portion or all of the operations described herein, in addition to or instead of processor 142 of computing device 140 disposed on vehicle 100. For example, processor 192 of remote computing device 190 may determine the tire parameters, the average wear value, the irregular wear type, the irregular wear value, execute and/or train first machine learning model 150 and/or second machine learning model 160, transmit notifications and/or recommendations and/or perform any other suitable operation described herein, in addition to processor 142 of computing device 140 or instead of processor 142 of computing device 140.

Figure 1B:
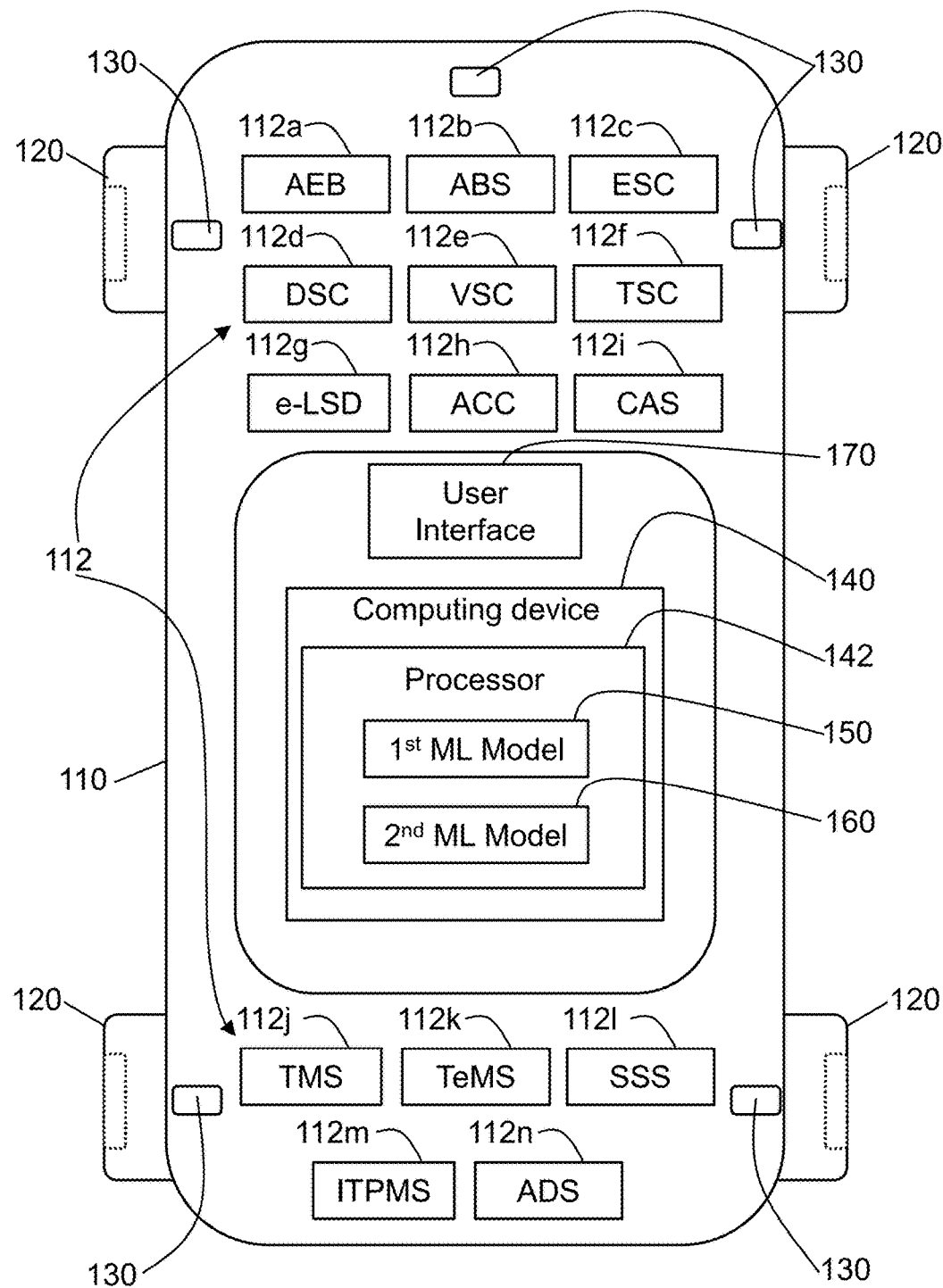
FIG. 1B is a schematic illustration of the vehicle of FIG. 1A, including a plurality of systems capable of adapting the operation thereof and the operation of the vehicle based on the determined wear of tires, according to some embodiments of the invention.

Reference is made to FIG. 1B, which is a schematic illustration of vehicle 100 of FIG. 1A, including a plurality of systems 170 of vehicle 100 capable of adapting the operation thereof and the operation of vehicle 100 based on the determined wear of tires 120, according to some embodiments of the invention.

Vehicle 100 may include a plurality of systems 112. Systems 112 may be Advanced Driver Assistance Systems (ADAS) Processor 142 may transmit a notification related to the determined wear of tires 120 (e.g., the average wear value, the indication of the irregular wear type and/or the irregular wear value) to at least one system of the plurality of systems 112 of vehicle 100. Systems 112 may adapt the operation thereof and/or the operation of vehicle 100 based on the determined wear of tires 120 (e.g., as described hereinbelow).

In one example, processor 142 may transmit the notification related to the determined wear of tires 120 (e.g., the average wear value, the indication of the irregular wear type and/or the irregular wear value) to an Automated Emergency Braking (AEB) system 112a of vehicle 100. Tire wear may affect the braking performance and stopping distance of vehicle 100. AEB system 105a may contribute to overall safety and stability of vehicle 100. The condition of tires 120 concerning tread depth (e.g., the wear of tires 120), may affect the overall grip and traction of vehicle 100. AEB system 150 may consider the current condition of tires (e.g., the wear of tires 120) to adjust braking strategies. Worn-out tires may have reduced grip in wet, snow, and icy conditions, which may lead to longer braking distances Based on the determined wear of tires 120, AEB system 112a may perform enhanced braking calculations. Based on the determined wear of tires 120, AEB system 112a may adjust braking force to be applied to the wheels. For example, AEB system 112a may modify the amount of braking force to be applied to the wheels to compensate for the reduced traction capabilities of worn tires, for example to ensure maximum braking efficiency without locking the wheels. Based on the determined wear of tires 120, AEB system 112a may more accurately calculate the required stopping distance for vehicle 100. Based on the more accurate value of the stopping distance, AEB system 112a may adjust the braking force and the timing of application thereof, for example ensure vehicle 100 may stop in time.

Based on the determined wear of tires 120, AEB system 112a may enhance its ability to avoid collisions. Based on the determined wear of tires 120, AEB system 112a may trigger the automatic braking sooner if the tires are significantly worn (e.g., if the determined tire wear exceeds a threshold), for example to provide more time to stop vehicle 100 safely. Based on the determined wear of tires 120, AEB system 112a may create different braking profiles that may account for various levels of tire wear, for example to allow dynamically adjusting the response of AEB system 112a according to the current tire wear condition.

Based on the determined wear of tires 120, AEB system 112a may monitor (e.g., continuously monitor), in real time, the tire wear levels and provide alerts to the driver about the impact of the tire wear on performance of AEB system 112a (e.g., encouraging timely tire maintenance or replacement to maintain optimal safety).

Based on the determined wear of tires 120, AEB system 112a may coordinate with other Advanced Driver Assistance Systems (ADAS), such as traction control and stability control system, to ensure a unified response that considers the ire wear (e.g., to enhance overall vehicle 100 safety and performance during emergency braking situations).

In another example, processor 142 may transmit the notification related to the determined wear of tires 120 (e.g., the average wear value, the indication of the irregular wear type and/or the irregular wear value) to an Antilock Braking System (ABS) 112b of vehicle 100. ABS 112b may prevent wheel lockup during hard (e.g., emergency) braking, for example by modulating brake pressure rapidly. This allows the driver to maintain steering control and/or prevent vehicle 100 from skidding. By preventing wheel lockup, ABS 112b may help to maximize traction during emergency braking and/or in slippery conditions. The tire type, unevenly inflated tires and the tire wear condition may directly influence performance of ABS 112b. For example, worn or unevenly inflated tires may respond differently to interventions of ABS 112b in operation of vehicle 100. ABS 112b may be optimized for use with specific tire types and tire conditions (e.g., tire wear conditions). By integrating the determined tire wear, ABS 112b may adjust its operation to account for the reduced grip, for example resulted from the tire wear.

Based on the determined wear of tires 120, ABS 112b may adjust (e.g., fine-tune) the frequency of brake pressure modulation, for example to optimize the stopping distance of vehicle 110 and control of vehicle 100 based on the current traction capability of the worn tires. Based on the determined wear of tires 120, ABS 112b may dynamically modify the pressure reduction and reapplication pressure rates, for example to prevent wheel lock-up more effectively when tires are worn (e.g., especially on wet or icy roads). Based on the determined wear of tires 120, ABS 112b may predict and adapt (e.g., enhance the existing prediction and adaptation) to the decreased effectiveness of worn tires, for example to allow for better overall braking performance of vehicle 100 under varied conditions.

In another example, processor 142 may transmit the notification related to the determined wear of tires 120 (e.g., the average wear value, the indication of the irregular wear type and/or the irregular wear value) to an Electronic Stability Control (ESC) system 112c of vehicle 100. Worn tires 120 may have reduced grip with the road and/or may affect the handling characteristics of vehicle 100. ESC system 112c may help maintain the stability of vehicle 100, for example by selectively braking individual wheels and/or adjusting engine power to prevent skidding and loss of control during cornering and/or evasive maneuvers. ESC system 112c may improve traction of tires 120 of vehicle 100, for example by preventing oversteer and understeer situations, particularly on slippery surfaces. The integration of the determined tire wear into ESC system 112c may optimize the stability and handling of vehicle 100. The tire wear data may enhance the functionality of ESC system 112c.

Based on the determined wear of tires 120, ESC system 112c may adjust intervention thresholds, for example by adapting the sensitivity of ESC system 112c and triggering interventions of ESC system 112c in operation of vehicle 100 earlier when tires 120 are worn, for example to prevent loss of control over vehicle 100.

Based on the determined wear of tires 120, ESC system 112c may adjust (e.g., fine tune) the distribution of braking force between the wheels of vehicle 100 based on the traction capabilities of each of tires 120, for example to ensure optimal stability of vehicle 100.

Based on the determined wear of tires 120, ESC system 112c may improve (e.g., enhance) the predictive models that ESC system 112c relies on to detect and correct skidding or loss of traction, for example to improve the accuracy of interventions of ESC system 112c in operation of vehicle 100.

Based on the determined wear of tires 120, ESC system 112c may adapt (e.g., modify) the amount of engine power reduction by considering the decreased traction of worn tires 120, for example to prevent oversteering or understeering.

Based on the determined wear of tires 120, ESC system 112c may monitor (e.g., continuously monitor), in real time, the tire wear levels to dynamically adjust the response of ESC system 112c during various driving conditions, for example to ensure consistent behavior and/or safety of vehicle 100.

In another example, processor 142 may transmit the notification related to the determined wear of tires 120 (e.g., the average wear value, the indication of the irregular wear type and/or the irregular wear value) to a Dynamic Stability Control (DSC) system 112d of vehicle 100. DSC 112d may be similar to ESC system 112c but with additional functionalities and enhancements. Integrating data about the determined wear of tires 120 data into DSC system 112d may significantly improve performance and safety features of DSC system 112d. DSC system 112d may combine the features of ESC system 112c with additional capabilities such as dynamic braking, adaptive handling adjustments, and traction control, for example to enhance overall stability and/or performance of vehicle 100. Integrating data about the determined wear of tires 120 into DSC system 112d may allow DSC system 112d to adapt to changing tire conditions (e.g., the tire wear conditions), for example to enhance the ability of DSC system 112d to maintain stability of vehicle 100, optimize handling of vehicle 100, and ensure safety of vehicle 100 under various driving conditions.

Based on the determined wear of tires 120, DSC system 112d may optimize stability interventions of DSC system 112d in operation of vehicle 100. Worn tires 120 may have less grip than unworn tires 120, which may affect the handling and/or stability of vehicle 100. Based on the determined wear of tires 120, DSC system 112d may adjust the timing of intervention of DSC system 112d in operation of vehicle 100, for example by triggering stability control interventions earlier when tires 120 are worn, e.g. to prevent skidding and loss of control. Based on the determined wear of tires 120, DSC system 112d may modulate brake force, for example by distributing braking force more precisely among the wheels, considering the reduced traction of worn tires 120, for example to maintain stability of vehicle 100.

Based on the determined wear of tires 120, DSC system 112d may enhance traction control of vehicle 100. Based on the determined wear of tires 120, DSC system 112d may adjust (e.g., fine-tune) traction control responses, for example by adjusting engine power and brake application to match the grip levels of worn tires 120, e.g. to prevent wheel slip.

Based on the determined wear of tires 120, DSC system 112d may modify the handling characteristics of vehicle 100, for example to ensure consistent performance and control. Based on the determined wear of tires 120, DSC system 112d may adapt the steering response of vehicle 100 to account for changes in handling due to the determined wear of tires 120. Based on the determined wear of tires 120, DSC system 112d may adjust (e.g., dynamically adjust) the suspension settings of vehicle 100, for example to compensate for reduced tire performance and/or enhance ride comfort and control.

Based on the determined wear of tires 120, DSC system 112d may improve predictive models used by DSC system 112d. For example, DSC system 112d may incorporate the determined wear of tires 120 into predictive algorithms used by DSC system 112d to anticipate and counteract potential instability, for example, to improve the accuracy and effectiveness of interventions of DSC system 112d in operation of vehicle 150.

Based on the determined wear of tires 120, DSC system 112d may monitor (e.g., continuously monitor) the wear of tires 120 and provide real-time alerts to the driver and/or advise on the need for replacement of tires 120, for example to maintain optimal performance of DSC system 112d and overall safety of vehicle 100.

In another example, processor 142 may transmit the notification related to the determined wear of tires 120 (e.g., the average wear value, the indication of the irregular wear type and/or the irregular wear value) to a Vehicle Stability Control (VSC) system 112e of vehicle 100. VSC system 112e (e.g., such as Electronic Stability Program (ESP) system) may help preventing skidding and loss of control over vehicle 110, for example by monitoring and adjusting the stability of vehicle 100 through automatic braking of individual wheels and/or reduction of engine power of vehicle 100.

The wear of tires 120 may impact the grip of tires 120 with the road and/or handling characteristics of vehicle 100. Based on the determined wear of tires 120, VSC system 112e may adjust stability interventions of VSC system 112e in operation of vehicle 100. VSC system 112e may modify the timing and intensity of stability interventions of VSC system 112e in operation of vehicle 100, for example to account for reduced traction from worn tires 120 with the road, preventing skidding and/or maintaining control of vehicle 100.

Based on the determined wear of tires 120, VSC system 112e may optimize (e.g., fine-tune) brake force distribution among the wheels of vehicle 100 according to the current traction capabilities of each of tires 120, for example to ensure better stability of vehicle 100.

Based on the determined wear of tires 120, VSC system 112e may enhance the predictive models that VSC system 112e is using, for example to improve the ability of VSC system 112e to detect and/or correct potential instability of vehicle 100.

Based on the determined wear of tires 120, VSC system 112e may adjust the amount of engine power reduction during VSC events, for example to match the decreased traction of worn tires 120 and/or ensuring smoother and more effective control of vehicle 100.

Based on the determined wear of tires 120, VSC system 112e may modify the handling responses of vehicle 100 in real-time. Based on the determined wear of tires 120, VSC system 112e may adapt the steering assist levels to compensate for changes in handling of vehicle 100 due to the wear of tires 120. Based on the determined wear of tires 120, VSC system 112e may adapt (e.g., dynamically adapt, in real time) suspension settings to improve handling and stability of vehicle 100 when tires 120 are worn.

Based on the determined wear of tires 120, VSC system 112e may monitor the wear levels of tires 120 and/or provide real-time alerts to the driver, for example advising on the need for tire maintenance or replacement to maintain optimal performance of VSC system 112e.

Based on the determined wear of tires 120, VSC system 112e may coordinate with other ADAS features such as Traction Control Systems (TCS) and AEB system 112a, for example to ensure a cohesive response that considers the determined wear of tires 120, e.g., to enhance overall safety and performance of vehicle 100.

In another example, processor 142 may transmit the notification related to the determined wear of tires 120 (e.g., the average wear value, the indication of the irregular wear type and/or the irregular wear value) to a Traction Control System (TCS) 112f of vehicle 100. TCS 112f may monitor wheel speed and prevent excessive wheel spin during acceleration, for example by modulating engine power or applying brakes to individual wheels. TCS 112f may enhance traction by preventing wheel spin, especially in low-traction situations such as snow, mud, or wet roads. Integrating the determined wear of tires into TCS 112f may significantly enhance the effectiveness and safety of vehicle 100.

The wear of tires 120 may affect the grip and traction capabilities of vehicle 100. Based on the determined wear of tires 120, TCS 112f may modify the sensitivity of TCS 112f to detect and respond to wheel slip earlier when tires 120 are worn, as worn tires may be more prone to slipping. Based on the determined wear of tires 120, TCS 112f may adapt the braking force applied to slipping wheels based on the reduced traction of worn tires 120, for example to ensure effective slip prevention without over-braking.

Based on the determined wear of tires 120, TCS 112f may reduce (e.g., gradually reduce) engine power to prevent wheel slip while maintaining smooth acceleration, considering the decreased grip of worn tires 120.

TCS 112f may incorporate the determined wear of tires 120 into predictive models used by TCS 112f, for example to better anticipate and manage wheel slip under various conditions.

Based on the determined wear of tires 120, TCS 112f may create different response profiles that account for varying levels of tire wear, for example to adjust (e.g., dynamically adjust) the response of TCS 112f based on real-time determined wear of tires 120.

Based on the determined wear of tires 120, TCS 112f may monitor (e.g., continuously monitor) tire wear levels and/or provide alerts to the driver about the impact on traction control performance, for example to encourage timely tire maintenance or replacement to ensure optimal safety of vehicle 100.

TCS 112f may coordinate with other ADAS systems (like Electronic Stability Control (ESC) and Automated Emergency Braking (AEB)) to provide a unified response that considers tire wear, enhancing overall vehicle safety and performance of vehicle 100.

In another example, processor 142 may transmit the notification related to the determined wear of tires 120 (e.g., the average wear value, the indication of the irregular wear type and/or the irregular wear value) to an Electronic Limited-Slip Differential (e-LSD) system 112g of vehicle 100.

e-LSD system 112g may use electronic controls to simulate the effects of a mechanical limited-slip differential, directing torque to the wheel with better traction. e-LSD system 112g may improve traction during acceleration by optimizing torque distribution between the drive wheels. Integrating the determined wear of tires 120 into e-LSD system 112g may significantly enhance their functionality and safety.

The wear of tires 120 may affect the grip and traction of tires 120. Based on the determined wear of tires 120, e-LSD system 112g may modify the distribution of torque between the wheels based on the reduced traction capabilities of worn tires 120, for example to ensure optimal grip and stability of vehicle 100. Based on the determined wear of tires 120, e-LSD system 112g may adapt (e.g., dynamically adapt) the response of e-LSD system 112g to wheel slip, for example by distributing more or less torque as needed to maintain control with worn tires 120.

Based on the determined wear of tires 120, e-LSD system 112g may enhance traction management of vehicle 100. Based on the determined wear of tires 120, e-LSD system 112g may enhance the ability of e-LSD system 112g to detect and manage potential wheel slip earlier, considering the decreased grip of worn tires 120. Based on the determined wear of tires 120, E-LSD system 112g may ensure smoother transitions in torque distribution, for example to prevent sudden changes that could destabilize vehicle 120 with worn tires 120.

Based on the determined wear of tires 120, e-LSD system 112g may improve handling and stability of vehicle 100. Based on the determined wear of tires 120, e-LSD system 112g may adjust (e.g., dynamically adjust) the handling characteristics to compensate for changes in traction and grip due to the wear of tires 120. Based on the determined wear of tires 120, e-LSD system 112g may operate in conjunction with other stability control systems to prevent oversteering or understeering caused by uneven or worn tires 120.

Based on the determined wear of tires 120, e-LSD system 112g may monitor (e.g., continuously monitor) the determined wear of tires 120 and provide real-time alerts to the driver about the impact on performance of e-LSD system 112d, for example to encourage timely tire maintenance or replacement.

e-LSD system 112g may coordinate with other ADAS systems (like Traction Control Systems (TCS) and Electronic Stability Control (ESC)) to ensure a cohesive and unified response that considers the determined wear of tires 120, for example to enhance overall vehicle safety and performance of vehicle 100.

In another example, processor 142 may transmit the notification related to the determined wear of tires 120 (e.g., the average wear value, the indication of the irregular wear type and/or the irregular wear value) to an Adaptive Cruise Control (ACC) system 112h of vehicle 100. ACC system 112h may use sensors to monitor the surroundings of vehicle 100 and adjust the speed or apply brakes of vehicle 100 to maintain a safe following distance and avoid collisions. By helping the driver maintain a safe speed and avoid abrupt maneuvers, ACC system 112h may contribute to maintaining optimal traction. Integrating the determine wear of tires 120 data into ACC system 112h may significantly enhance their performance and safety. ACC system 112h may automatically adjusts the speed of vehicle 100 to maintain a safe distance from the vehicle ahead.

The wear of tires 120 may affect braking performance and stopping distance of vehicle 100. Based on the determined wear of tires 120, ACC system 112h may adjust the following distance, for example by increasing the following distance to account for the longer stopping distances required by worn tires 120, e.g. to ensure a safer buffer zone. Based on the determined wear of tires 120, ACC system 112h may adjust (e.g., modulate) speed adjustments, for example by adapting the rate of speed changes to ensure smoother deceleration and acceleration, considering the reduced traction of worn tires 120.

Based on the determined wear of tires 120, ACC system 112*h* may improve braking response for worn tires 120. Based on the determined wear of tires 120, ACC system 112*h* may perform predictive braking adjustments, for example by applying brakes earlier and more gradually when tires 120 are worn, providing additional time to slow down vehicle 100 safely. Based on the determined wear of tires 120, ACC system 112*h* may adapt (e.g., modify) the braking force based on the current condition (e.g., wear condition) of tires 120, e.g. to ensure effective deceleration without wheel lock-up.

ACC system 112*h* may monitor (e.g., continuously monitor) the determined wear of tires 120 and provide alerts to the driver about the impact on ACC system 112*h* performance, for example to encourage timely tire maintenance or replacement.

ACC system 112*h* may coordinate with other ADAS systems (like Traction Control and Stability Control) to provide a unified response that considers the determined wear of tires 120, for expel to enhance overall safety and performance of vehicle 100.

In another example, processor 142 may transmit the notification related to the determined wear of tires 120 (e.g., the average wear value, the indication of the irregular wear type and/or the irregular wear value) to a Collision Avoidance System (CAS) 112*i* of vehicle 100. CAS 112*i* may use sensors to monitor the surroundings of vehicle 100 and adjust the speed or apply brakes of vehicle 100 to maintain a safe following distance and avoid collisions. By helping the driver maintain a safe speed and avoid abrupt maneuvers, CAS 112*i* may contribute to maintaining optimal traction. Integrating the determine wear of tires 120 data into CAS 112*i* may significantly enhance their performance and safety. CAS 112*i* may detect potential collisions and take preventive actions, such as warning the driver or applying the brakes automatically.

The wear of tires 120 may affect the ability of vehicle 100 to stop quickly. Based on the determined wear of tires 120, CAS 112*i* may issue collision warnings earlier if the tires 120 are worn, providing the driver with more time to react. Based on the determined wear of tires 120, CAS 112*i* may adjust the timing and force of automatic braking to account for the reduced grip and longer stopping distances of worn tires 120.

Based on the determined wear of tires 120, CAS 112*i* may trigger preventive actions (like gentle braking or steering adjustments) earlier when tires 120 are worn, for example to reduce the risk of a collision. Based on the determined wear of tires 120, CAS 112*i* may adjust (e.g., tailor) the response of CAS 112*i* to match the current condition (e.g., the wear condition) of tires 120, for example to ensure effective collision avoidance maneuvers.

CAS 112*i* may monitor (continuously monitor) the determined wear of tire 120 and provide alerts to the driver about the impact on collision avoidance performance, for example to encourage timely tire maintenance or replacement.

CAS 112*i* may coordinate with other ADAS systems (like ACC and Electronic Stability Control) to ensure a cohesive and comprehensive response that considers the determined wear of tires 120, for example to enhance overall safety and performance of vehicle 100.

In another example, processor 142 may transmit the notification related to the determined wear of tires 120 (e.g., the average wear value, the indication of the irregular wear type and/or the irregular wear value) to a Tire Management System (TMS) 112*j* of vehicle 100. TMS 112*j* may monitor pressure, temperature, and overall condition of tires 120 to ensure optimal performance and safety of tires 120. By integrating the determined wear of tires 120, TMS 112*j* may provide more accurate and comprehensive monitoring, enhancing vehicle safety, performance, and maintenance efficiency. This integration may ensure that drivers are well-informed about the condition (e.g., wear condition) of their tires 120 and the necessary actions to maintain optimal health of tires 120 and safety of vehicle 100.

Based on the determined wear of tires 120, TMS 112*j* may monitor (e.g., continuously monitor) the tire tread depth and/or the wear patterns to detect uneven (e.g., irregular) wear or tires 120 approaching the end of their lifespan. Based on the determined wear of tires 120, TMS 112*j* may alert the driver when the determined wear of tires 120 reaches critical levels (e.g., thresholds), and suggest timely tire rotations, alignments and/or replacements.

Based on the determined wear of tires 120, TMS 112*j* may provide feedback (e.g., real time feedback) to the driver about tire condition (e.g., wear condition) and its impact on performance of vehicle 100. TMS 112*j* may display alerts and warnings on the vehicle's dashboard when the determined wear of tires reaches critical levels or when uneven wear is detected. Based on the determined wear of tires 120, TMS 112*j* may offer specific maintenance recommendations based on, for example to prolong tire life and maintain safety.

Based on the determined wear of tires 120, TMS 112*j* may improve (e.g., optimize) tire performance and fuel efficiency (e.g., by understanding the wear rates, cost per km for tire, cost per km fuel, etc.).

Based on the determined wear of tires 120, TMS 112*j* may adjust recommended tire pressure settings based on the wear levels, for example to ensure even wear and optimal performance of tires 120.

TMS 112*j* may alert drivers to conditions that might reduce fuel efficiency or increase wear of tires 120, such as underinflation or overinflation.

TMS 112*j* may incorporate the determined wear of tires 120 into predictive maintenance and performance algorithms. TMS 112*j* may use the history the determined wear of tires 120 to predict future wear patterns and/or maintenance needs. TMS 112*j* may enhance safety predictions by understanding how worn tires 120 affect stopping distances, handling and/or traction.

In another example, processor 142 may transmit the notification related to the determined wear of tires 120 (e.g., the average wear value, the indication of the irregular wear type and/or the irregular wear value) to a Terrain Management System (TeMS) 112*k* of vehicle 100.

TeMS 112*k* may optimize settings of vehicle 100 (such as throttle response, transmission, and traction control) based on the driving environment. TeMS 112*k* may enhance traction, e.g. by adapting vehicle parameters to specific driving conditions, such as mud, sand, or snow. TeMS 112*k* may utilize various sensors and data inputs to optimize performance based on road conditions. Incorporating the determined wear of tires 120 into TeMS 112*k* may enhance TeMS 112*k* by adjusting vehicle settings based on the tire's grip and traction capabilities, which change as tires 120 wear down. TeMS 112*k* may adjust vehicle settings such as throttle response, transmission shift points, traction control, and stability control to optimize performance on various terrains like snow, mud, sand, and rocks.

The wear of tires 120 may affect traction on different terrains. Based on the determined wear of tires 120, TeMS 112k may adjust (e.g., modify) traction control settings to account for the reduced grip of worn tires 120, for example to ensure better performance and safety on challenging terrains. Based on the determined wear of tires 120, TeMS 112k may adapt (e.g., dynamically adapt) the distribution of torque between wheels to maintain optimal traction and control, considering the reduced effectiveness of worn tires 120.

Based on the determined wear of tires 120, TeMS 112k may optimize (e.g., fine-tune) terrain-specific modes of TeMS 112k. Based on the determined wear of tires 120, TeMS 112k may increase the sensitivity of traction and stability control systems to prevent slippage with worn tires on slippery surfaces (e.g., in a snow mode). Based on the determined wear of tires 120, TeMS 112k may adjust throttle response and torque delivery to prevent wheel spin with worn tires 120 on loose or uneven surfaces (e.g., in mud and sand mode). Based on the determined wear of tires 120, TeMS 112k may enhance low-speed control and torque modulation to improve stability and grip with worn tires 120 on rocky terrain (e.g., in rock mode).

TeMS 112k may incorporate the determined wear of tires 120 into the predictive models used by TeMS 112k. Based on the determined wear of tires 120, TeMS 112k may anticipate and adjust vehicle settings to maintain performance across different terrains. Based on the determined wear of tires 120, TeMS 112k may enhance the ability of TeMS 112k to predict and react to potential traction issues caused by worn tires 120, e.g. to improve overall safety of vehicle 100.

TeMS 112k may monitor (e.g., continuously monitor) the determined wear of tires 120 and provide real-time feedback to the driver. Based on the determined wear of tires 120, TeMS 112k may notify the driver of reduced performance capabilities on specific terrains due to the tire wear, encouraging cautious driving. Based on the determined wear of tires 120, TeMS 112k may suggest timely tire rotations, alignments, or replacements to maintain optimal performance and safety of vehicle 100.

TeMS 112k may coordinate with other ADAS systems (like Traction Control Systems (TCS), Electronic Stability Control (ESC), and Adaptive Cruise Control (ACC)) to ensure a cohesive response that considers the determined wear of tires 120. TeMS 112k may ensure all systems work together to adapt to the determined wear of tires 120, providing a seamless and safe driving experience across different terrains.

TeMS 112k may adjust the vehicle's handling characteristics dynamically based on real-time determined wear of tires 120. Based on the determined wear of tires 120, TeMS 112k may modify steering response to maintain control and stability with worn tires 120. Based on the determined wear of tires 120, TeMS 112k may adjust suspension settings to enhance ride comfort and control on rough terrains with worn tires 120.

In another example, processor 142 may transmit the notification related to the determined wear of tires 120 (e.g., the average wear value, the indication of the irregular wear type and/or the irregular wear value) to a Smart Suspension System (SSS) 1121 of vehicle 100. Electronically controlled SSS 1121 may adjust damping rates in real-time based on driving conditions, optimizing tire contact with the road. SSS 1121 may enhance traction by adapting to varying road surfaces and providing optimal tire grip. SSS 1121 may benefit from the determined wear of tires 120 information by dynamically adjusting suspension settings to compensate for changes in tire characteristics due to wear of tires 120. As tires 120 wear down, their ability to absorb shocks and maintain traction may diminish, which may affect ride comfort and handling of vehicle 100. By incorporating the determined wear of tires 120 into SSS 1121, SSS 1121 can proactively adapt damping, stiffness, or ride height to optimize comfort, stability, and performance based on the current condition (e.g., wear condition) of tires 120. Integrating the determined wear of tires 120 into SSS 1121 may significantly enhance vehicle performance, ride comfort, and safety. SSS 1121 may adjust the vehicle's suspension settings in real time to optimize ride comfort, handling, and stability based on driving conditions and driver preferences.

The wear of tires may affect the vehicle's handling and ride quality. Based on the determined wear of tires 120, SSS 1121 may adjust the damping rates to compensate for changes in grip and stability caused by worn tires 120, for example to provide a smoother and more controlled ride. Based on the determined wear of tires 120, SSS 1121 may adjust (e.g., modify) ride height settings to ensure optimal ground clearance and stability, considering the reduced performance of worn tires 120.

Based on the determined wear of tires 120, SSS 1121 may improve vehicle handling and stability. Based on the determined wear of tires 120, SSS 1121 may adapt suspension stiffness and damping during cornering to counteract the reduced grip of worn tires, maintaining stability and control. Based on the determined wear of tires 120, SSS 1121 may adjust suspension settings to balance the load more effectively across all tires, enhancing stability and reducing uneven tire wear.

Based on the determined wear of tires 120, SSS 1121 may improve predictive algorithms used by SSS 1121. Based on the determined wear of tires 120, SSS 1121 may anticipate and make real-time adjustments to suspension settings, e.g. to maintain consistent performance of SSS 1121. Based on the determined wear of tires 120, SSS 1121 may enhance the ability of SSS 1121 to predict and mitigate potential handling issues caused by worn tires, improving overall safety.

SSS 1121 may monitor (e.g., continuously monitor) the determined wear of tires 120 and provide real-time feedback to the driver. Based on the determined wear of tires 120, SSS 1121 may notify the driver of any changes in suspension performance due to tire wear, for example to encourage timely maintenance of tires 120. Based on the determined wear of tires 120, SSS 1121 may suggest tire rotations, alignments, or replacements based on wear data to maintain optimal suspension performance and vehicle safety.

SSS 1121 may coordinate with other ADAS systems (like Traction Control Systems (TCS), Electronic Stability Control (ESC), and Adaptive Cruise Control (ACC)) to ensure a cohesive response that considers the determined wear of tires 120. SSS 1121 may ensure all systems work together to adapt to the determined wear of tires 120, providing a seamless and safe driving experience.

Based on the determined wear of tires 120, SSS 1121 may adjust comfort settings dynamically based on real-time determined wear of tires 120. Based on the determined wear of tires 120, SSS 1121 may modify suspension settings to minimize vibrations and shocks from the road, especially important when tire wear affects ride quality. Based on the determined wear of tires 120, SSS 1121 may adapt to various road conditions more effectively, considering the reduced cushioning effect of worn tires 120.

In another example, processor 142 may transmit the notification related to the determined wear of tires 120 (e.g., the average wear value, the indication of the irregular wear type and/or the irregular wear value) to an Indirect Tire Pressure Monitoring System (ITPMS)112*m* of vehicle 100. Integrating the determined wear of tires 120 into ITPMS 112*m* may significantly enhance its functionality and accuracy. ITPMS 112*m* may estimate tire pressure by monitoring wheel speed and comparing rotational differences between the wheels. ITPMS 112*m* may use data from the vehicle's anti-lock braking system (ABS) sensors to infer pressure changes. By integrating the determined wear of tires 120, ITPMS 112*m* may improve its accuracy and reliability, providing more precise tire pressure monitoring and reducing false alerts. This integration may ensure that drivers receive accurate and timely information about tire pressure, enhancing overall safety and performance of vehicle 100.

The wear of tires 120 may affect the circumference and rolling radius of tire 120, which may impact the accuracy of ITPMS 112*m*. Based on the determined wear of tires 120, ITPMS 112*m* may adjust the calibration of wheel speed sensors to account for the reduced circumference of worn tires 120, e.g. to ensure accurate pressure estimates. Based on the determined wear of tires 120, ITPMS 112*m* may adjust the calibration of wheel speed sensors to account for the reduced circumference of worn tires, for example to ensure accurate pressure estimates. Based on the determined wear of tires 120, ITPMS 112*m* may distinguish between changes in wheel speed due to pressure loss and those due to wear, reducing false alerts.

ITPMS 112*m* may integrate the determined wear of tires 120 into the predictive algorithms used by indirect ITPMS 112*m*. Based on the determined wear of tires 120, ITPMS 112*m* may anticipate the impact of tire wear on wheel speed readings and adjust the system's sensitivity to pressure changes accordingly. Based on the determined wear of tires 120, ITPMS 112*m* may modify detection thresholds for pressure loss alerts to account for the altered rotational characteristics of worn tires.

ITPMS 112*m* may monitor (e.g., continuously monitor) the determined wear of tires 120 and provide real-time feedback to the driver. Based on the determined wear of tires 120, ITPMS 112*m* may inform the driver about the potential impact of tire wear on accuracy ITPMS 112*m* and suggest maintenance actions. Based on the determined wear of tires 120, ITPMS 112*m* may provide timely recommendations for tire rotations, alignments, or replacements based on wear data to maintain optimal system performance.

ITPMS 112*m* may coordinate with other ADAS systems (like ABS, Traction Control Systems (TCS), and Electronic Stability Control (ESC)) to ensure a cohesive response that considers the determined wear of tires 120. Based on the determined wear of tires 120, ITPMS 112*m* may ensure all systems work together to adapt to the determined wear of tires, for example to enhance overall vehicle safety and performance.

ITPMS 112*m* may implement adaptive calibration processes that use the determined wear of tires 12- to maintain the accuracy of ITPMS 112*m* over the lifespan of the tires 120. Based on the determined wear of tires 120, ITPMS 112*m* may recalibrate (e.g., periodically recalibrate) the system based on real-time determined wear of tires 120, for example to ensure consistent accuracy. Based on the determined wear of tires 120, ITPMS 112*m* may adjust the system's sensitivity dynamically to account for changes in tire dimensions and characteristics due to the wear.

In another example, processor 142 may transmit the notification related to the determined wear of tires 120 (e.g., the average wear value, the indication of the irregular wear type and/or the irregular wear value) to an Aquaplaning (e.g., Hydroplaning) Detection System (ADS) 112*n* of vehicle 100. Integrating the determined wear of tires 120 into ADS 112*n* may significantly enhance the system's ability to predict and prevent loss of traction due to water on the road. By integrating the determined wear of tires 120, ADS 112*n* may more accurately predict and prevent hydroplaning, improving vehicle safety and maintaining control in wet conditions. This integration may ensure that drivers are better informed about the risks and can take appropriate actions to mitigate them. ADS 112*n* may detect and predict the risk of hydroplaning by monitoring factors such as water depth, tire pressure, and vehicle speed. ADS 112*n* may alert the driver or adjust vehicle dynamics to maintain control.

The wear of tires 120 may affects the ability of tires 120 to channel water away from the contact patch, increasing the risk of hydroplaning. Based on the determined wear of tires 120, ADS 112*n* may adjust the threshold for aquaplane detection based on the reduced tread depth and water-channeling capacity of worn tires 120. Based on the determined wear of tires 120, ADS 112*n* may provide earlier warnings of hydroplaning risk when tires are worn, e.g., to allow the driver more time to react.

ADS 112*n* may integrate the determined wear of tires 120 into the detection algorithms used by ADS 112*n*. Based on the determined wear of tires 120, ADS 112*n* may increase the sensitivity of the system to changes in traction when tires 120 are worn, e.g. to improve the detection of potential hydroplaning events. Based on the determined wear of tires 120, ADS 112*n* may assess (e.g., continuously assess) the hydroplaning risk by combining the real time determined wear of tires 120 with real-time inputs such as speed, water depth and/or tire pressure.

ADS 112*n* may use the determined wear of tires 120 information to enhance vehicle stability and control during potential hydroplaning situations. Based on the determined wear of tires 120, ADS 112*n* may modify the traction control system's response based on the reduced grip of worn tires to prevent loss of control. Based on the determined wear of tires 120, ADS 112*n* may adjust electronic stability control interventions to maintain vehicle stability when hydroplaning is detected, considering the reduced effectiveness of worn tires 120.

ADS 112*n* may monitor (e.g., continuously monitor) the determined wear of tires 120 and provide real-time feedback to the driver. Based on the determined wear of tires 120, ADS 112*n* may inform the driver about increased hydroplaning risks due to tire wear, suggesting reduced speeds or more cautious driving in wet conditions. Based on the determined wear of tires 120, ADS 112*n* may recommend timely tire maintenance or replacement based on wear data to reduce the risk of hydroplaning.

ADS 112*n* may coordinate with other ADAS systems (like ABS, Traction Control Systems (TCS), and Adaptive Cruise Control (ACC)) to ensure a cohesive response that considers the determined wear of tires 120. ADS 112*n* may ensure all systems work together to adapt to the determined wear of tires 120, e.g. to enhance overall vehicle safety and performance.

ADS 112*n* may implement adaptive calibration processes that use the determined wear of tires 120 to maintain the accuracy of aquaplane detection over the lifespan of tires 120. Based on the determined wear of tires 120, ADS 112*n* may recalibrate (e.g., periodically recalibrate) the system based on real-time wear data to ensure consistent performance. Based on the determined wear of tires 120, ADS 112*n* may adjust the system's hydroplaning detection capabilities dynamically to account for changes in tire characteristics due to wear.

Figure 1C:
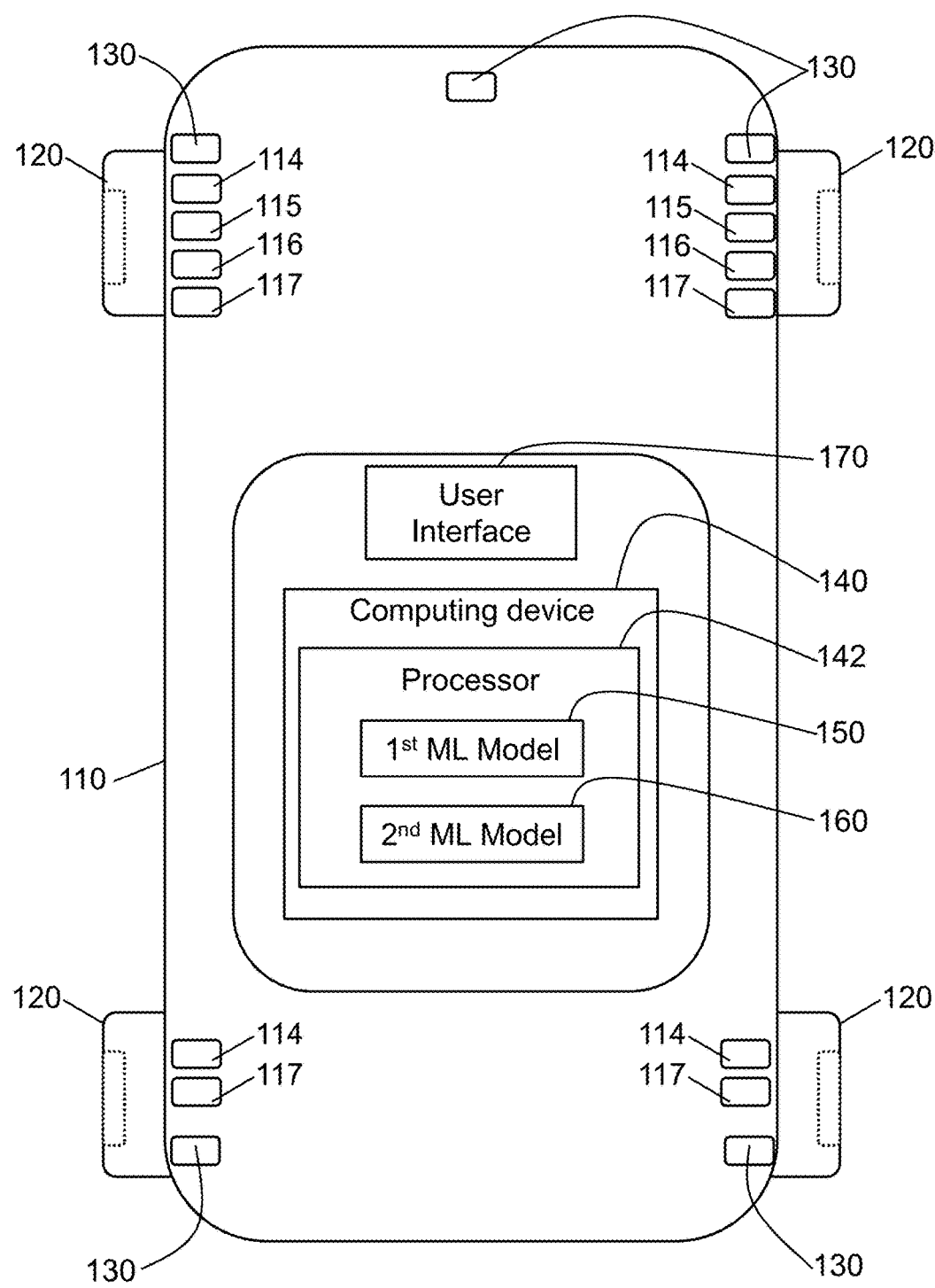
FIG. 1C is a schematic illustration of the vehicle of FIG. 1A, including braking units, motors, steering units and suspension units capable of adapting the operation thereof based on the determined wear of tires, according to some embodiments of the invention.

Reference is made to FIG. 1C, which is a schematic illustration of vehicle 100 of FIG. 1A, including braking units 114, motors 115, steering units 116 and suspension units 117 capable of adapting the operation thereof based on the determined wear of tires 120, according to some embodiments of the invention.

Processor 142 may control (e.g., adapt) the operation of braking units 114, motors 115, steering units 116 and/or suspension units 117 based on the determined wear of tires 120 (e.g., the average wear value, the indication of the irregular wear type and/or the irregular wear value), for example as described above with respect to FIG. 1B. Processor 142 may control (e.g., adapt) the operation of braking units 114, motors 115, steering units 116 and/or suspension units 117 based on the determined wear of tires 120 directly or via ADAS systems 112 as described above with respect to FIG. 1B.

For example, processor 142 may control (e.g., adapt or adjust) the amount of braking force and/or the timing of application of the braking force by braking units 114 based on the determined wear of tires 120 (e.g., as described above with respect to FIG. 1B).

In another example, processor 142 may control (e.g., adapt or adjust) the torque applied by motors 115 to tires 120 based on determined wear of tires 120 (e.g., as described above with respect to FIG. 1B).

In another example, processor 142 may control (e.g., adapt or adjust) steering parameters of steering units 116 based on determined wear of tires 120 (e.g., as described above with respect to FIG. 1B). The steering parameters may include a steering assist torque (e.g., indicative of how much the steering system helps the driver steer the car), a steering ratio (e.g., rotation of the steering wheel to the wheel angle) and/or any other suitable parameter related to steering units 116 of vehicle 100.

In another example, processor 142 may control (e.g., adapt or adjust) suspension parameters of suspension units 117 based on determined wear of tires 120 (e.g., as described above with respect to FIG. 1B). The suspension parameters may include a compression rate (e.g., how fast the suspension compresses), a rebound rate (e.g., how fast the suspension releases) and/or other suitable parameter related to suspension units 117 of vehicle 100.

Processor 142 may transmit the determined wear of tires 120 (e.g., the average wear value, the indication of the irregular wear type and/or the irregular wear value) to braking units 114, motors 115, steering units 116 and/or suspension units 117 of vehicle 100. Braking units 114, motors 115, steering units 116 and/or suspension units 117 may adapt their operation based on the determined wear of tires 120 (e.g., as described above with respect to FIG. 1B).

Figure 2A:
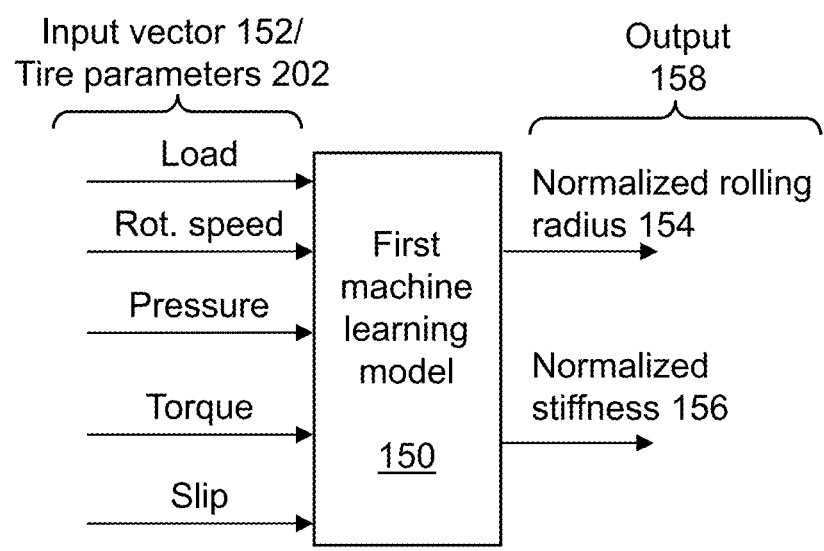
FIG. 2A is a block diagram of a first machine learning model for determining a normalized rolling radius and/or a normalized stiffness of the tires of the vehicle, according to some embodiments of the invention.

Reference is made to FIG. 2A, which is a block diagram of first machine learning model 150 for determining the normalized rolling radius and/or the normalized stiffness of tires 120 of vehicle 100, according to some embodiments of the invention.

First machine learning model 150 may be a software model that may be executed by a processor such as processor 142 of computing device 140 disposed on vehicle 100 and/or processor 192 of remote computing device 190. An input to first machine learning model 150 may include a plurality of tire parameters 202 determined for each tire of tires 120. Tire parameters 202 for each tire of tires 120 may be determined by the processor based on signals from one or more sensors of sensors 130 obtained during the ride of vehicle 100 (e.g., as described above with respect to FIG. 1). Tire parameters 202 determined each tire of tires 120 may include a load (e.g., a static load and/or a dynamic load) acting on the respective tire, a rotational speed of the respective tire, a pressure within the respective tire, a torque acting on the respective tire and/or a slip of the respective tire.

In some embodiments, tire parameters 202 of each tire of tires 120 are determined based on signals from one or more sensors of sensors 130 obtained during the ride of vehicle 100. In these embodiments, the effect of tire parameters 202 on the effective rolling radius and/or the effective stiffness of the respective tire can be normalized in order to, for example, use these parameters for determination of the wear of the respective tire (e.g., as described herein). The normalization may be performed by first machine learning model 150 which may determine, for each tire of tires 120, the normalized rolling radius of the respective tire (e.g., being the effective rolling radius of the tire as it is at the zero speed and/or the zero load condition) and/or the normalized stiffness of the respective tire (e.g., being the effective stiffness of the respective tire as it is under the zero torque condition).

For each tire of tires 120, the processor may convert tire parameters 202 determined for the respective tire into an input vector 152 that may be input to first machine learning model 150. For example, input vector 152 may include a plurality of values, wherein each of the values may include one of the load, the rotational speed the pressure, the torque and the slip of the respective tire. Based on input vector 152 determined for each tire of tires 120, first machine learning model 150 may determine normalized rolling radius 154 and/or normalized stiffness 156 of the respective tire and provide normalized rolling radius 154 and/or normalized stiffness 156 of the respective tire as output 158.

Figure 2B:
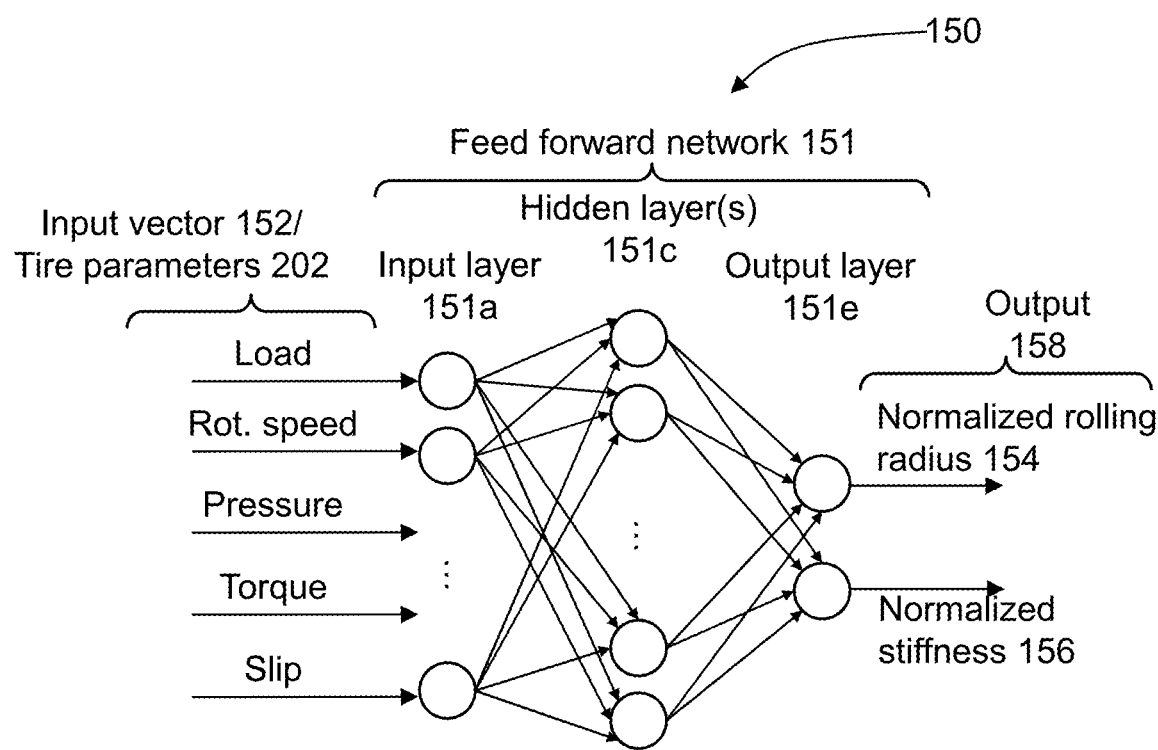
FIG. 2B is a block diagram of the first machine learning model embodied as a feedforward neural network, according to some embodiments of the invention.

Reference is made to FIG. 2B, which is a block diagram of first machine learning model 150 embodied as a feedforward neural network 151, according to some embodiments of the invention.

First machine learning model 150 may include a feedforward neural network 151. Feedforward neural network 151 may include an input layer 151*a*, one or more hidden layers 151*c*, and an output layer 151*e*. The information may flow through feedforward neural network 151 in a forward direction from input layer 151*a* through the one or more hidden layers 151*c* to output layer 151*e*. Input layer 151*a* may include a plurality of nodes, wherein each of the nodes may receive one of the values of input vector 152 or any other suitable feature that may be derived from the values of input vector 152. Each node in the one or more hidden layers 151*c* and in output layer 151*e* may be connected to all the nodes in the previous layer with weighted connections. The input values from the previous layer may be multiplied by the corresponding weights and summed up at each node in the current layer. After the weighted sum is calculated, an activation function may be applied to determine the output of each node based on the weighted sum. The output from the activation function may become the input for the next layer. This process may continue until output layer 151*e* is reached. Output layer 151*e* may produce the final result (e.g., output 158) based on the information propagated from the previous layers. Feedforward neural network 151 may process input vector 152 generated for the tire (e.g., based on the tire parameters 202 determined for the tire as described hereinabove) through the multiple layers of nodes by applying weighted connections and/or activation functions to generate output 158 which is normalized rolling radius 156 and/or normalized stiffness 158.

First machine learning model 150 may include models other than feedforward neural network 151. For example, first machine learning model 150 may include a recurrent neural network (RNN), a logistic regression model and/or any other suitable machine learning model.

Figure 2C:
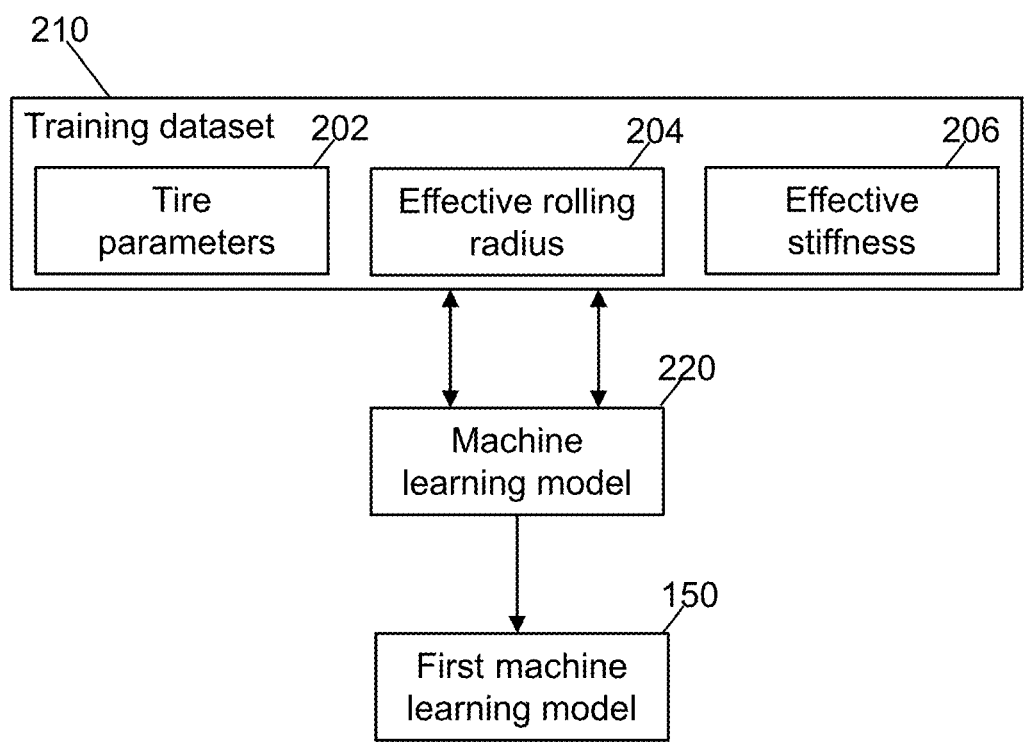
FIG. 2C is a block diagram of a training process of the first machine learning mode, according to some embodiments of the invention.

Reference is made to FIG. 2C, which is a block diagram of a training process of first machine learning model 150, according to some embodiments of the invention.

First machine learning model 150 may be trained in real time during one or more rides of vehicle 100 on the road. For example, first machine learning model 150 may be trained by the processor based on data determined from signals obtained from one or more sensors of sensors 130 of vehicle 100 in real time during the ride (e.g., one or more rides) of vehicle 100. The training of first machine learning model 150 may be vehicle specific. For example, first machine learning model 150 may be trained for each particular vehicle based on data determined on signals from the one or more sensors of that particular vehicle during the rides of that particular vehicle.

In a training process, the processor may generate a training dataset 210 for each tire of tires 120 of vehicle 100. Training dataset 210 generated for each tire of tires 120 may include tire parameters 202 (e.g., the load, the rotational speed, the, the torque and/or the slip) determined for the respective tire. Training dataset 210 may be labeled (e.g., tagged) with a correct output such as a reference effective rolling radius 204 and/or a reference effective stiffness 206. Reference effective rolling radius 204 and/or reference stiffness 206 used for labeling of training dataset 210 of each tire of tires 120 may be determined based on a subset of tire parameters 202 of the respective tire and other vehicle parameters. For example, reference effective rolling radius 204 of each tire of tires 120 may be determined based on velocity of the vehicle, the rotational speed of the respective tire and nominal dimensions of the respective tire. In another example, reference effective rolling radius 204 of each tire of tires 120 may be determined based on the rotational speed of the respective tire and data from geolocation sensor of vehicle 100. Reference effective stiffness 206 each tire of tires 120 determined based on the torque force acting on the respective tire over the slip of the respective tire.

Based on training dataset 210 generated for each tire of tires 120, the processor may train a machine learning model 220 (e.g., such as feedforward neural network 151 and/or any other suitable machine learning model) to determine relationships between the parameters of tire parameters 202 to determine reference effective rolling radius 204 and/or reference effective stiffness 206 of the respective tire. The processor may repeat the training process a plurality of times for each tire of tires 120. Each time the process is repeated, different training dataset 210 generated for different sets of tire parameters 202 may be used. At the end of the training process, first machine learning model 150 may be achieved. After the training, first machine learning model 150 may extrapolate the normalized rolling radius for tire parameters values that were not included in training datasets, for example for zero speed and/or zero load conditions. After the training, first machine learning model 150 may extrapolate the normalized stiffness for tire parameters values that were not included in training datasets, for example for zero torque condition.

In the example of feedforward neural network 151 described hereinabove, training dataset 210 may be propagated forward through the feedforward neural network to calculate the output. The loss or error between the predicted output and the correct output may be calculated using a loss function to calculate an error. The loss may be then backpropagated through the feedforward neural network to update the weights and biases using an optimization algorithm such as a gradient descent algorithm or any other suitable algorithm. The process of forward propagation, loss calculation, and backpropagation may be repeated a plurality of times to adjust the weights iteratively to achieve first machine learning model 150.

First machine learning model 150 may determine (e.g., trained to determine) normalized rolling radius 154 and/or normalized stiffness 156 of each tire of tires 120 of vehicle 100 based on signals from one or more sensors of sensors 130 of vehicle 100 (e.g., instead and/or in addition to tire parameters 202). For example, signals from inertial sensors, wheel speed sensors, torque sensors pressure sensors and/or any other suitable sensors of sensors 130 of vehicle 100 may be provided as an input to first machine learning model 150 that may determine normalized rolling radius 154 and/or normalized stiffness 156 of each tire of tires 120 of vehicle 100 based on the signals.

Figure 3A:
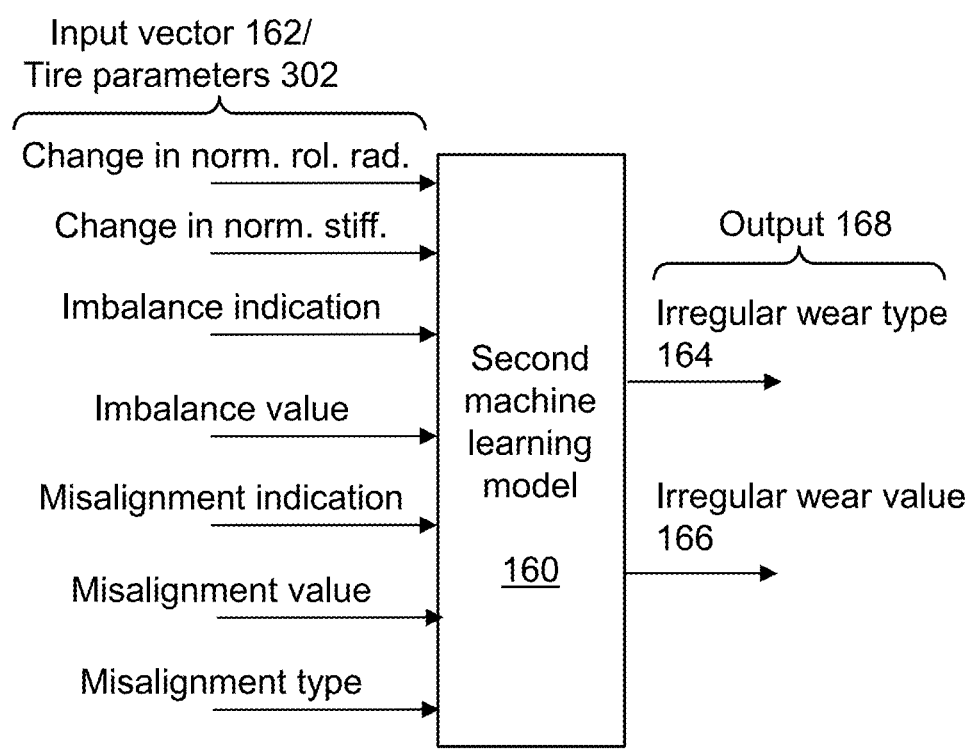
FIG. 3A is a block diagram of a second machine learning model for determining the irregular wear type and/or the irregular wear value of the tires of the vehicle, according to some embodiments of the invention.

Reference is made to FIG. 3A, which is a block diagram of second machine learning model 160 for determining the irregular wear type and/or the irregular wear value of tires 120 of vehicle 100, according to some embodiments of the invention.

Second machine learning model 160 may be a software executed by a processor 300 (e.g., such as processor 142 of computing device 100 disposed on vehicle 100 and/or processor 192 of remote computing device 190) to determine the irregular wear type and/or the irregular wear value of each tire of tires 120 based on tire parameters 302 determined for the respective tire. Tire parameters 302 determined for each tire of tires 120 may include data concerning the change in the normalized rolling radius of the respective tire over the period of time, data concerning the change of the normalized stiffness of the respective tire over a period of time, the indication of imbalance of the respective tire, the imbalance value of the respective tire, the indication of misalignment of the respective tire, the misalignment value of the respective tire and/or the misalignment type of the respective tire (e.g., as described above with respect to FIG. 1).

For each tire of tires 120, processor 300 may convert tire parameters 302 determined for the respective tire into an input vector 162. Input vector 162 determined for each tire of tires 120 may include a plurality of values, wherein each of the values may be indicative of one of the change of normalized rolling radius of the respective over the period of time, the change in the normalized stiffness of the respective tire over the period of time, indication of imbalance of the respective tire, the imbalance value of the respective tire, the indication of misalignment of the respective tire, the misalignment value of the respective tire and/or the misalignment type of the respective tire. Based on input vector 162 determined for each tire of tires 120, second machine learning model 160 may determine irregular wear type 164 and/or irregular wear value 166 of the respective tire and provide irregular wear type 164 and/or irregular wear value 166 of the respective tire as output 168.

Second machine learning model 160 may include a feedforward neural network (e.g., such as feedforward neural network 151 described above with respect to FIG. 2B). Second machine learning model 160 may include models other than the feedforward neural network. For example, second machine learning model 160 may include a logistic regression model and/or support vector machine model.

Figure 3B:
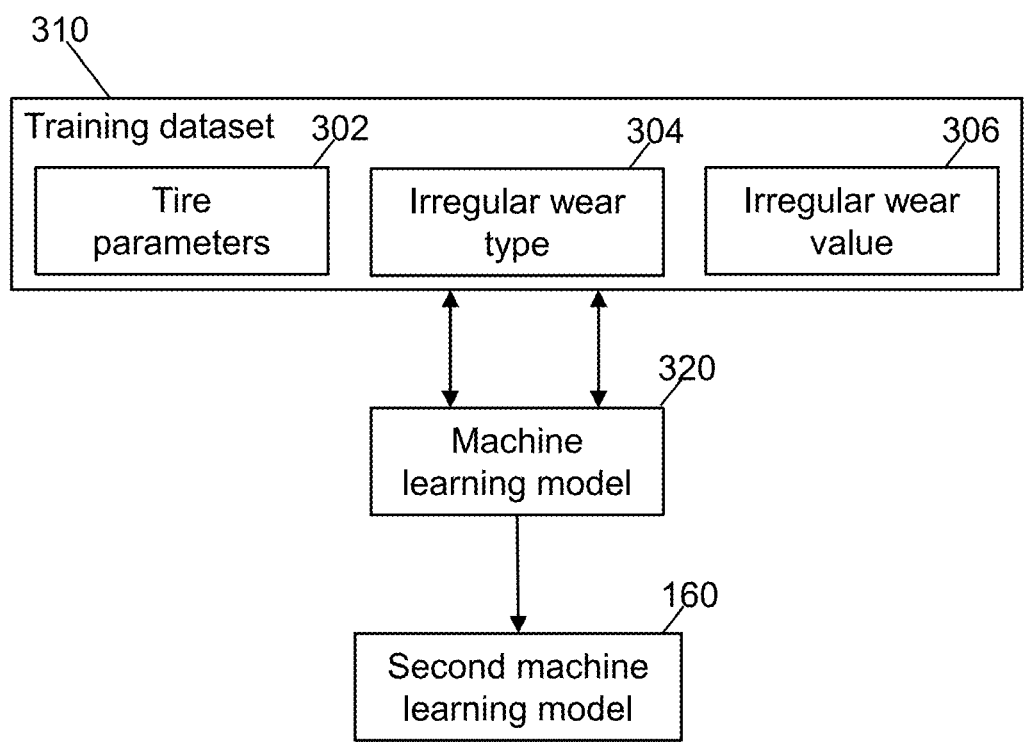
FIG. 3B is a block diagram of a training process of the second machine learning model, according to some embodiments of the invention.

Reference is made to FIG. 3B, which is a block diagram of a training process of second machine learning model 160, according to some embodiments of the invention.

Training of second machine learning model 160 may be performed in an offline regime. Training data for training of second machine learning model 160 may be collected by sensors of a plurality of vehicles (referred herein as "training vehicles") during a plurality of rides. The training vehicles may include computing devices (e.g., such as computing device 140) capable of determining tire parameters 302 (e.g., as described above with respect to FIG. 3A). The training vehicles may also include sensors such as cameras, lasers and/or any other suitable sensors for monitoring the actual irregular wear type and/or the actual irregular wear value of the tires during the rides of the training vehicles.

In a training process, processor 301 may generate a training dataset 310 based on the training data collected from the training vehicles. Training dataset 310 may include tire parameters 302 labeled (e.g., tagged) with a reference irregular wear type 304 and/or a reference irregular wear value 306 that correspond to a subset of tire parameters 302. For example, it may be determined from the training data that for a tire having a certain change in the normalized stiffness over a certain period of time and/or a certain imbalance value and/or a certain misalignment type, the tire may have a certain reference irregular wear type and/or a certain reference irregular wear value that may be used for labeling of training dataset 310.

Based on training dataset 310, processor 301 may train a machine learning model 320 (e.g., such as a feedforward neural network and/or any other suitable machine learning model) to determine relationships between the parameters of tire parameters a 302 to determine reference irregular wear type 304 and/or reference irregular wear value 306. Processor 301 may repeat the training process a plurality of times. Each time the process is repeated, different labeled training dataset 310 may be generated using different sets of tire parameters 302. At the end of the training process, second machine learning model 160 may be achieved. Second machine learning model 160 may be then loaded into computing device 140 and/or remote computing device 192 for determination of the irregular wear type and/or irregular wear value of tires 120 of vehicle 100.

Second machine learning model 160 may determine (e.g., trained to determine) irregular wear type 164 and/or irregular wear value 166 of the respective tire of each tire of tires 120 of vehicle 100 based on signals from one or more sensors of sensors 130 of vehicle 100 (e.g., instead and/or in addition to tire parameters 302). For example, signals from inertial sensors, wheel speed sensors, torque sensors pressure sensors and/or any other suitable sensors of sensors 130 of vehicle 100 may be provided as an input to second machine learning model 160 that may determine irregular wear type 164 and/or irregular wear value 166 of the respective tire of each tire of tires 120 of vehicle 100 based on the signals.

Examples of different irregular wear types that may be determined by processor 142 according to some embodiments of the invention are shown in FIGS. 9A, 9B, 9C, 9D and 9E.

Figure 4:
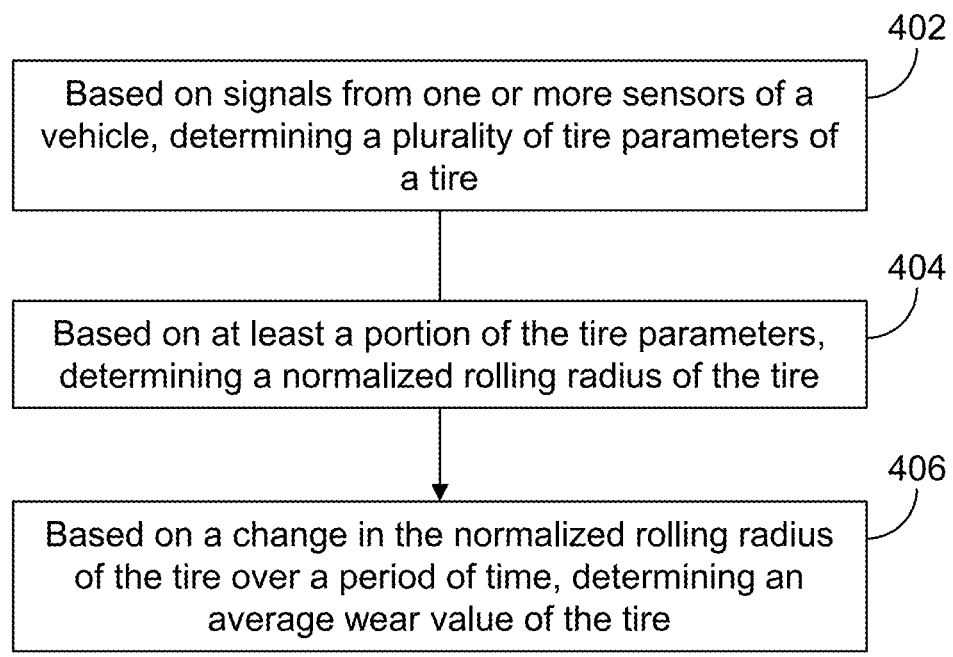
FIG. 4 is a flowchart of a method of determining an average wear measure of a tire, according to some embodiments of the invention.

Reference is made to FIG. 4, which is a flowchart of a method of determining an average wear measure of a tire, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 402, a plurality of tire parameters may be determined based on signals from one or more sensors of a vehicle (e.g., such as sensors 130 described with respect to FIG. 1 and as described below with respect to FIG. 11). The signals may be obtained from the one or more sensors during one or more rides of the vehicle (e.g., such as sensors 130 described with respect to FIG. 1 and as described below with respect to FIG. 11). The determined tire parameters may include a rotational speed of the tire, a pressure within the tire, a load of the tire, a torque of the tire and a slip of the tire (e.g., such as sensors 130 described with respect to FIG. 1 and as described below with respect to FIG. 11).

In operation 404, based on at least a portion of the tire parameters, a normalized rolling radius of the tire may be determined (e.g., as described above with respect to FIG. 1). The normalized rolling radius may be an effective rolling radius of the tire under a zero rotational speed, a zero load or both (e.g., as described above with respect to FIG. 1). The normalized rolling radius of the tire may be determined providing at least a portion of the tire parameters as an input into a first machine learning model (e.g., first machine learning model 150 described above with respect to FIGS. 1 and 2A-2B). The first machine learning model may be trained based on training datasets that may include the tire parameters labeled with reference effective rolling radius values such that the first machine learning model may learn to normalize an effect of the tire parameters on the effective rolling radius of the tire (e.g., as described above with respect to FIG. 2C).

In operation 406, based on a change in the normalized rolling radius of the tire over a period of time, an average wear value of the tire may be determined (e.g., as described above with respect to FIG. 1).

Based on at least a portion of the tire parameters, a normalized stiffness of the tire may be determined (e.g., as described above with respect to FIG. 1). The normalized stiffness of the tire may be an effective stiffness of the tire under a zero torque (e.g., as described above with respect to FIG. 1). The normalized stiffness of the tire may be determined by providing at least a portion of the tire parameters as an input into the first machine learning model (e.g., first machine learning model 150 described above with respect to FIGS. 1 and 2A-2B). The first machine learning model may be trained based on training datasets that may include the tire parameters labeled with reference effective stiffness values such that the machine learning model learns to normalize an effect of the tire parameters on the effective stiffness of the tire (e.g., as described with respect to FIG. 2C).

Based on the change in the normalized rolling radius of the tire and a change of the normalized stiffness of the tire over the period of time, at least one of an irregular wear type of the tire and an irregular wear value of the tire may be determined (e.g., as described above with respect to FIG. 1). At least one of the irregular wear type of the tire and the irregular wear value of the tire may be determined by providing at least a portion of the tire parameters as an input into a second machine learning model (e.g., second machine learning model 160 described above with respect to FIGS. 1 and 3A). The second machine learning model may be trained based on training datasets that may include the changes of the normalized rolling radius and the normalized stiffness of the tire labeled with at least one of reference irregular wear types and reference irregular wear values (e.g., as described above with respect to FIG. 3B).

Based on the signals from the one or more sensors of the vehicle, at least one of an indication that the tire is imbalanced and an imbalance value of the tire may be determined (e.g., such as sensors 130 described with respect to FIG. 1 and as described below with respect to FIG. 12). Further based on at least one of the indication that the tire is imbalanced and the imbalance value of the tire, at least one of the irregular wear type of the tire and the irregular wear value of the tire may be determined (e.g., as described above with respect to FIGS. 1A and 3A).

Based on the signals from the one or more sensors of the vehicle, at least one of an indication that the tire is misaligned and a misalignment value of the tire may be determined (e.g., such as sensors 130 described with respect to FIG. 1 and as described below with respect to FIG. 13). Further based on at least one of the indication that the tire is misaligned and the misalignment value of the tire, at least one of the irregular wear type of the tire and the irregular wear value of the tire may be determined (e.g., as described above with respect to FIGS. 1A and 3A).

Based on a change in the normalized rolling radius of the tire, the replacement of the tire has been with the new tire may be determined (e.g., as described above with respect to FIG. 1). If it is determined that the tire has been replaced, the tire parameters determined for the respective tire may be reset. Resetting the tire parameters for the replaced tire may be important to, for example, eliminate errors in wear determination of the respective tire.

Notifications indicative of the determined average wear value of the tire may be transmitted, for example to the user of the vehicle and/or to the authorized third party and/or to systems of the vehicle (e.g., as described with respect to FIG. 1). Based on the determined average wear value of the tire, recommendations may be generated and transmitted for example to the user of the vehicle and/or to the authorized third party and/or to the systems of the vehicle (e.g., as described with respect to FIG. 1).

Figure 5:
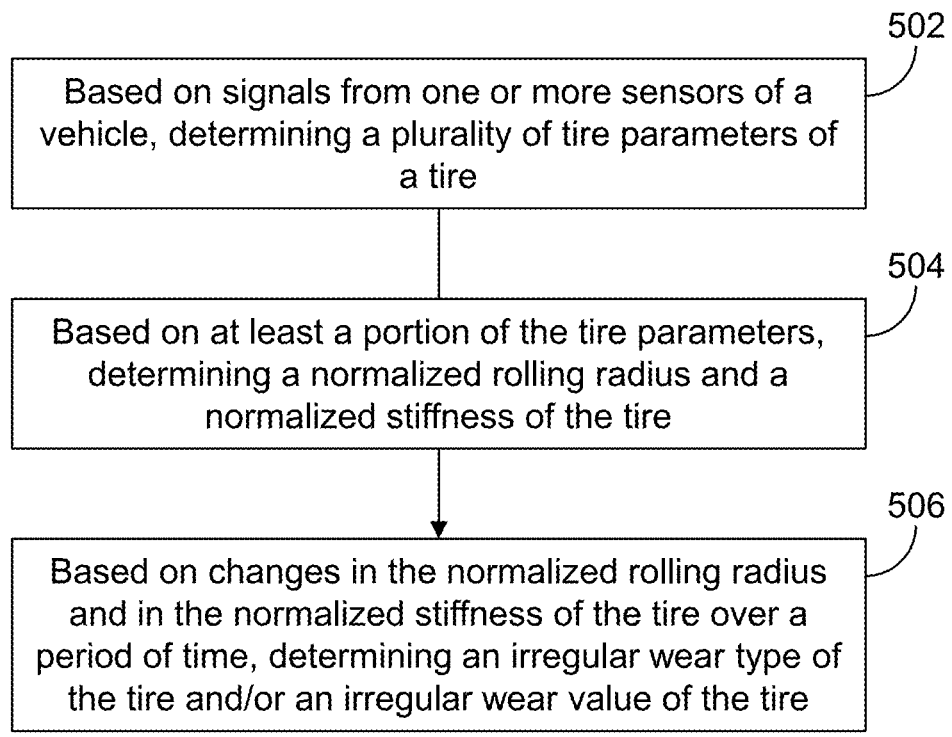
FIG. 5 is flowchart of a method of determining of an irregular wear type of a tire and/or of an irregular wear value of the tire, according to some embodiments of the invention.

Reference is made to FIG. 5, which is flowchart of a method of determining of an irregular wear type of a tire and/or of an irregular wear value of the tire, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 502, a plurality of tire parameters may be determined based on signals from one or more sensors of a vehicle (e.g., such as sensors 130 described with respect to FIG. 1 and as described below with respect to FIG. 11). The signals may be obtained from the one or more sensors during one or more rides of the vehicle (e.g., such as sensors 130 described with respect to FIG. 1 and as described below with respect to FIG. 11). The tire parameters determined may include a rotational speed of the tire, a pressure within the tire, a load of the tire, a torque of the tire and a slip of the tire (e.g., such as sensors 130 described with respect to FIG. 1 and as described below with respect to FIG. 11).

In operation 504, based on at least a portion of the tire parameters, a normalized rolling radius of the tire and a normalized stiffness of the tire may be determined (e.g., as described above with respect to FIG. 1). The normalized rolling radius may be an effective rolling radius of the tire under a zero rotational speed, a zero load or both (e.g., as described above with respect to FIG. 1). The normalized stiffness of the tire may be an effective stiffness of the tire under a zero torque (e.g., as described above with respect to FIG. 1). The normalized rolling radius and the normalized stiffness of the tire may be determined by providing at least a portion of the tire parameters as an input into a first machine learning model (e.g., first machine learning model 150 described above with respect to FIGS. 1 and 2A-2B). The first machine learning model may be trained based on training datasets that may include the tire parameters labeled with reference effective rolling radius values and reference effective stiffness values such that the machine learning model learns to normalize an effect of the tire parameters on the effective rolling radius of the tire and the effective stiffness of the tire (e.g., as described above with respect to FIG. 2C).

In operation 506, based on a change in the normalized rolling radius and a change in the normalized stiffness of the tire over a period of time, an irregular wear type of the tire and/or an irregular wear value of the tire may be determined (e.g., as described above with respect to FIG. 1). The irregular wear type of the tire and/or the irregular wear value of the tire may be determined by providing at least a portion of the tire parameters as an input into a second machine learning model (e.g., second machine learning model 160 described above with respect to FIGS. 1 and 3A). The machine learning model may be trained based on training datasets that may include the changes of the normalized rolling radius and the normalized stiffness of the tire labeled with at least one of reference irregular wear types and reference irregular wear values (e.g., as described above with respect to FIG. 3B).

Based on the signals from the one or more sensors of the vehicle, at least one of an indication that the tire is imbalanced and an imbalance value of the tire may be determined (e.g., such as sensors 130 described with respect to FIG. 1 and as described below with respect to FIG. 12). Further based on at least one of the indication that the tire is imbalanced and the imbalance value of the tire, at least one of the irregular wear type of the tire and the irregular wear value of the tire may be determined (e.g., as described above with respect to FIGS. 1 and 3A).

Based on the signals from the one or more sensors of the vehicle, at least one of an indication that the tire is misaligned and a misalignment value of the tire may be determined (e.g., such as sensors 130 described with respect to FIG. 1 and as described below with respect to FIG. 13). Further based on at least one of the indication that the tire is misaligned and the misalignment value of the tire, at least one of the irregular wear type of the tire and the irregular wear value of the tire may be determined (e.g., as described above with respect to FIGS. 1 and 3A).

Based on a change in the normalized rolling radius of the tire, the replacement of the tire has been with the new tire may be determined (e.g., as described hereinabove). If it is determined that the tire has been replaced, the tire parameters determined for the respective tire may be reset. Resetting the tire parameters for the replaced tire may be important to, for example, eliminate errors in wear determination of the respective tire.

Notifications indicative of the determined average wear value of the tire may be transmitted, for example to the user of the vehicle and/or to the authorized third party and/or systems of the vehicle (e.g., as described above with respect to FIG. 1). Based on the determined average wear value of the tire, recommendations may be generated and transmitted for example to the user of the vehicle and/or to the authorized third party and/or the systems of the vehicle (e.g., as described above with respect to FIG. 1).

Figure 6:
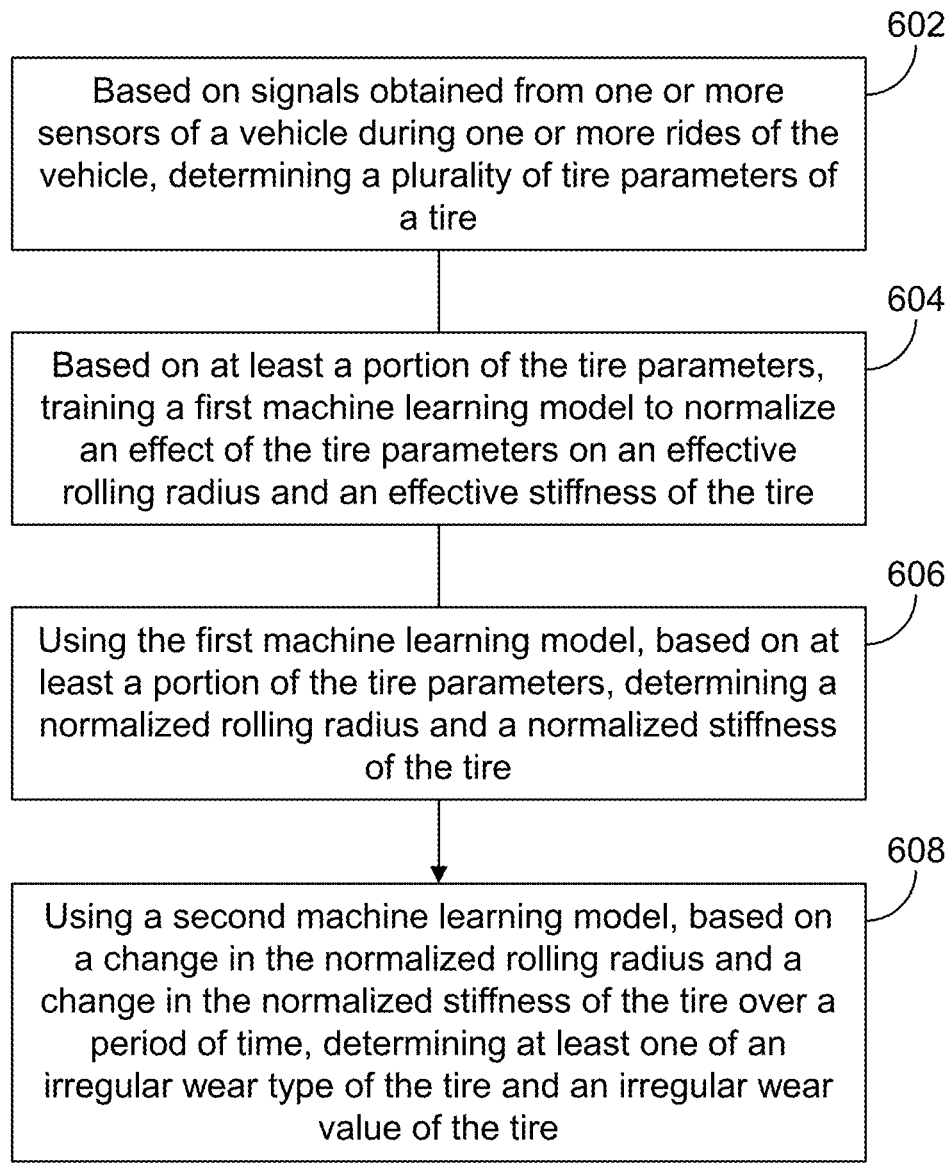
FIG. 6 is flowchart a method of determining of an irregular wear type of a tire and/or of an irregular wear value of the tire using machine learning models, according to some embodiments of the invention.

Reference is made to FIG. 6, which is flowchart a method of determining of an irregular wear type of a tire and/or of an irregular wear value of the tire using machine learning models, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 602, based on signals obtained from one or more sensors of a vehicle during one or more rides of the vehicle, determining a plurality of tire parameters of a tire (e.g., such as sensors 130 described with respect to FIG. 1 and as described below with respect to FIG. 11). The tire parameters determined may include a rotational speed of the tire, a pressure within the tire, a load of the tire, a torque of the tire and a slip of the tire (e.g., such as sensors 130 described with respect to FIG. 1 and as described below with respect to FIG. 11).

In operation 604 based on at least a portion of the tire parameters, a first machine learning model (e.g., first machine learning model 150 described hereinabove) may be trained to normalize an effect of the tire parameters on an effective rolling radius and an effective stiffness of the tire (e.g., as described above with respect to FIG. 2C).

In operation 606, using the first machine learning model, based on at least a portion of the tire parameters, a normalized rolling radius of the tire and a normalized stiffness of the tire may be determined (e.g., as described above with respect to FIGS. 1 and 2A-2B). The normalized rolling radius may be an effective rolling radius of the tire under a zero rotational speed, a zero load or both (e.g., as described above with respect to FIG. 1). The normalized stiffness of the tire may be an effective stiffness of the tire under a zero torque (e.g., as described above with respect to FIG. 1).

In operation 608, using a second machine learning model (e.g., second machine learning model 160 described hereinabove), based on a change in the normalized rolling radius and a change in the normalized stiffness of the tire over a period of time, an irregular wear type of the tire and/or an irregular wear value of the tire may be determined (e.g., as described above with respect to FIGS. 1 and 3A). The second machine learning model may be trained based on training datasets that may include the changes of the normalized rolling radius and the normalized stiffness of the tire labeled with at least one of reference irregular wear types and reference irregular wear values (e.g., as described above with respect to FIG. 3B).

Based on the signals from the one or more sensors of the vehicle, at least one of: an indication that the tire is imbalanced, an imbalance value of the tire, an indication that the tire is misaligned and a misalignment value of the tire may be determined (e.g., such as sensors 130 described with respect to FIG. 1 and as described below with respect to FIGS. 11 and 12). Using the second machine learning model, based on at least one of the indication that the tire is imbalanced, the imbalance value of the tire, the indication that the tire is misaligned and the misalignment value of the tire, the irregular wear type of the tire and/or the irregular wear value of the tire may be determined (e.g., as described above with respect to FIGS. 1 and 3A).

Reference is made to FIG. 7A, which is a graph showing the effect of the load acting on the tire and the effect of the rotational speed of the tire on the effective rolling radius of the tire, according to some embodiments of the invention.

Reference is also made to FIG. 7B, which is a graph showing the effect of the pressure of tire and the effect of the rotational speed of the tire on the effective rolling radius of the tire, according to some embodiments of the invention.

As shown in FIGS. 7A and 7B, the effective rolling radius of the tire is strongly affected by the load acting on the tire, the pressure of the tire and the rotational speed of the tire. Therefore, it is important to normalize the effective rolling radius of the tire with respect to the pressure of the tire, the load acting on the tire and/or the rotational speed of the tire (e.g., as described above with respect to FIGS. 1 and 2A-2C).

Reference is made to FIGS. 8A, which is a graph showing the effect of the pressure of tire and the effect of the load acting on the tire on the effective longitudinal stiffness of the tire, according to some embodiments of the invention.

Reference is also made to FIGS. 8B, which is a graph showing the effect of the pressure of tire and the effect of the load acting on the tire on the effective lateral stiffness of the tire, according to some embodiments of the invention.

As shown in FIGS. 8A and 8B, the effective stiffness (e.g., longitudinal and lateral stiffness) of the tire is strongly affected by the pressure of the tire and the load acting on the tire. Therefore, it is important to normalize the effective stiffness of the tire with respect to the pressure of the tire and/or the load acting on the tire (e.g., as described FIGS. 1 and 2A-2C).

Reference is made to FIGS. 9A, 9B, 9C, 9D and 9E, which are illustrations of different irregular wear types of the tire that may be determined according to some embodiments of the invention.

The irregular wear types shown in FIGS. 9A, 9B, 9C, 9D and 9E may be determined by processor 142 of computing device 140 disposed on vehicle 140 and/or by processor 192 of remote computing device, for example as described above with respect to FIGS. 1 and 3A-3B.

Figure 9A:
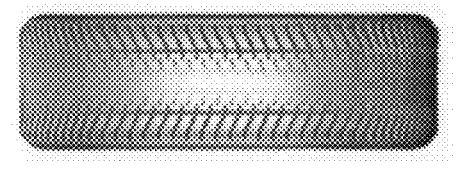
FIGS. 9A, 9B, 9C, 9D and 9E are illustrations of different irregular wear types of the tire that may be determined according to some embodiments of the invention.
Figure 9B:
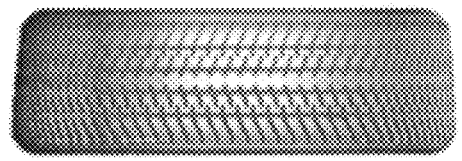
Figure 9C:
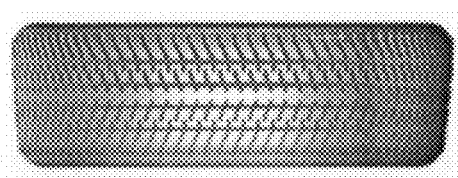
Figure 9D:
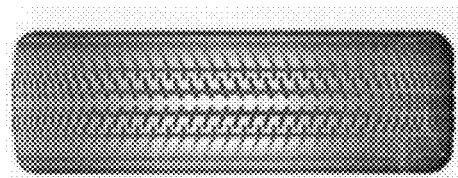
Figure 9E:
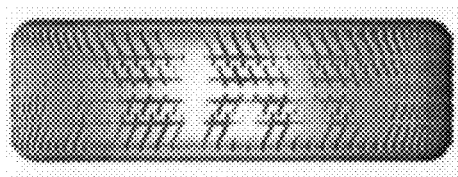

FIG. 9A shows a central wear type that may be caused by overinflation of the tire. FIGS. 9B and 9C show inside shoulder wear type and outside shoulder wear type, respectively, that may be caused by misalignment of tires. FIG. 9D shows both shoulders wear type that may be caused by underinflation of the tire. FIG. 9E shows a patch wear type that may be caused by imbalanced tire.

Reference is made to FIG. 10, which is a graph showing the change of the normalized rolling radius and the wear of the tire as function of driven distance, according to some embodiments of the invention.

As shown in FIG. 10, the normalized rolling radius decreases of the tire decreases over time as function of driven distance (kilometers) and the wear of the tire increases as function of the driven distance as can be determined by embodiments of the present invention.

Figure 11:
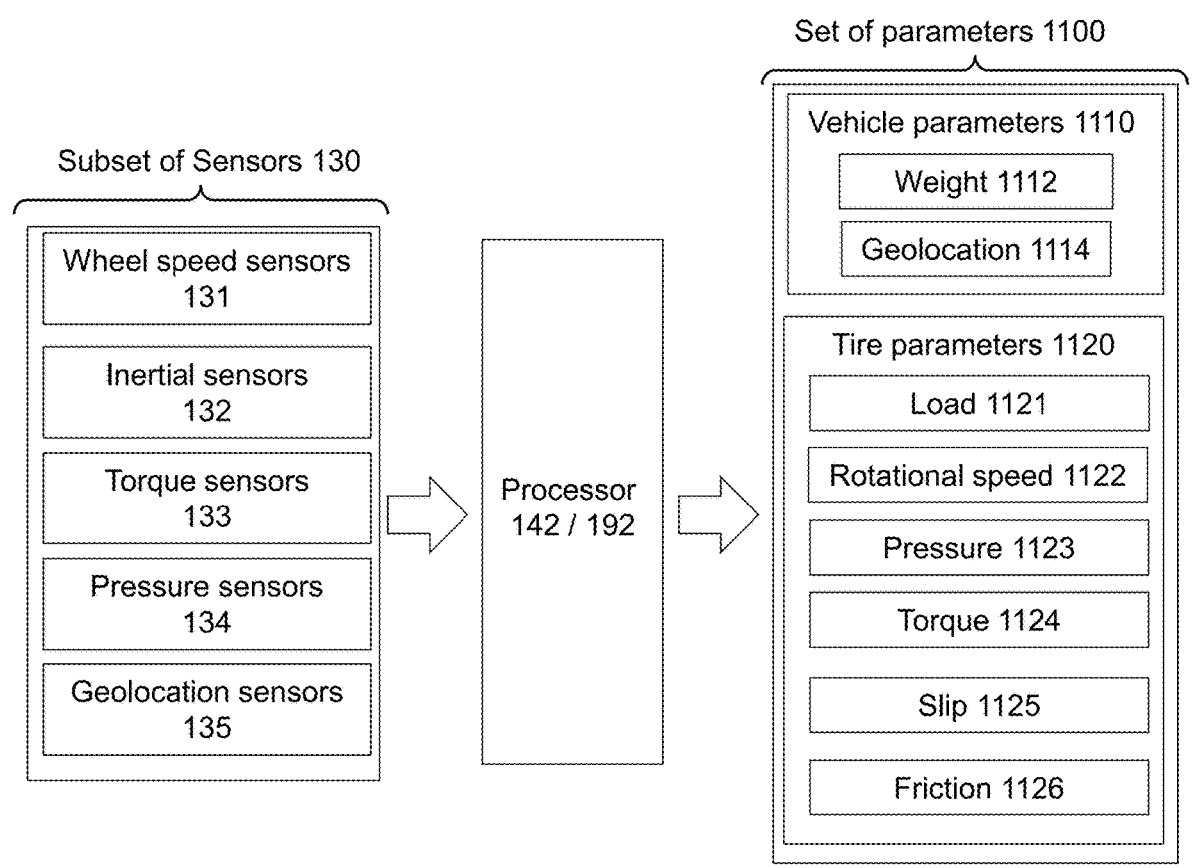
FIG. 11 which is a block diagram indicating a subset of sensors of the vehicle and a set of parameters that may be determined based on signals from the one or more sensors, according to some embodiments of the invention.

Reference is made to FIG. 11, which is a block diagram indicating a subset of sensors 130 of vehicle 100 and a set of parameters 1100 that may be determined based on signals from one or more sensors, according to some embodiments of the invention.

Set of parameters 1100 may be determined by processor 142 of computing device 140 disposed on vehicle 100 and/or processor 192 of remote computing device 190 and/or any other suitable computing device operating a processor. Set of parameters 1100 may be determined based on signals from one or more sensors of sensors 130 of vehicle 100. The signals may be obtained from one or more sensors of sensors 130 of vehicle 100 during one or more rides of vehicle 100

(e.g., as described above with respect to FIG. 1). Sensors 130 may, for example, include wheel speed sensors 131, inertial sensors 132, pressure sensors 133, torque sensors 134, geolocation sensors and/or any other suitable sensors of sensors 130 of vehicle 100 (e.g., as schematically shown in FIG. 11).

Set of parameters 1100 may include vehicle parameters 1110 such as weight 1112 of vehicle 100, geolocation 1114 of vehicle 100 and/or any other suitable vehicle parameters.

Set of parameters 1100 may include tire parameters 1120 such as a load (e.g., a static load and/or a dynamic load) 1121 acting on the tire, a rotational speed 1122 of the tire, a pressure 1123 within the tire, a torque 1124 acting on the tire, a slip 1125 of the tire and/or a friction 1126 of the tire. Tire parameters 1120 may be determined for each tire of tires 120 of vehicle 100 (e.g., as described above with respect to FIG. 1).

Tire parameters 1120 such as a rotation speed 1122 of the tire, a pressure 1123 within the tire and/or a torque 1124 acting on the tire may be directly determined from signals from one or more sensors of sensors 130 of the vehicle 100. For example, rotational speed 1123 of the tire may be determined based on signals from one or more wheel speed sensors 131; pressure 1123 within the tire may be determined based on signals from one or more pressure sensors 134; torque 1124 acting on the tire may be determined based on signals from one or more torque sensors 133.

Other tire parameters 1120 such as slip 1125 of the tire and/or load 1121 acting on the tire may be determined based on tire parameters 1122 such as rotational speed 1122 of the tire, pressure 1123 within the tire, torque 1124 acting on the tire), vehicle parameters 1110 such as weight 1112 of vehicle 100 and/or geolocation 1114 of vehicle 100 and/or signals from the one or more sensors of sensors 130 of vehicle 100.

Weight 1112 of vehicle 100 may be determined based on an engine torque (e.g., obtained from one of torque sensors 133) of vehicle 100, losses of vehicle 100 and acceleration (e.g., obtained from inertial sensors 132) of vehicle 100. For example, weight 1112 of vehicle 100 may be expressed by a force equation:

Vehicle Weight=Vehicle_Mass×Vehicle_Acceleration=Engine torque−Vehicle_Losses.

The losses of vehicle 100 may be determined based on the rolling resistance of tires 120 of vehicle 100, drag of vehicle 100, operation of air conditioning within vehicle 100, age of engine of vehicle 100 and/or based on any other suitable parameters that may affect the losses of vehicle 100. At a first stage, the engine torque signal may be corrected for different loss conditions or scenarios (e.g., for different weights, on/off air conditioning scenarios, different speeds) and an engine torque correction factor may be calculated for different parameters such as different round-per-minute values, different acceleration values and/or different gear position values. At a second stage, based on the engine torque correction factor, a general error factor of the engine torque and the different loss parameters may be calculated. For example, a calibration period with a plurality of sampling points for different vehicle weights may be used and the optimal parameters may be fit for calculating the minimal error. At a third stage, based on the general error factor of the engine torque, weight 1112 of vehicle 100 may be calculated. For example, different results from the forces equation described above may be weighted by the quality measure of the segment of the segment points, wherein the quality measure may depend on the acceleration magnitude and/or gear position.

Geolocation 1114 of vehicle 100 may be determined based on an unloaded effective rolling radius of tires 120, data from inertial sensors 132, data from wheel speed sensors 131 and/or data from geolocation sensors 135. The unloaded effective rolling radius of tires 120 may be known (e.g., from the specifications of tires 120). At a first stage, data from inertial sensors 132 may be corrected based on data from wheel speed sensors 131 and unloaded effective rolling radius of tires 120. At a second stage, a lookup table of geolocation correction factor may be calculated based on a location grid (e.g., latitude and longitude), velocity of vehicle 100 and/or acceleration (e.g., lateral and/or longitudinal acceleration) of vehicle 100. The geolocation correction factor may be calculated based on comparison of the corrected data from inertial sensors 132 and the data from geolocation sensors 135. At a third stage, based on the geolocation correction factor geolocation 1114 of vehicle 100 may be calculated.

Load 1121 acting on the tire may be determined based on weight 1112 of vehicle 100 and the relative effective rolling radii of tires 120. For example, the greater the compression of the tire, the smaller the effective rolling radius of the respective tire, the greater the load acting on the respective tire. Based on the relationship between the effective rolling radii of tires 120 and weight 1112 of vehicle 100, the load acting on the tire may be determined.

In some embodiments, it may be desired to consider the variation of load 1121 acting on the tire over time (e.g., dynamic load). If the vehicle does not exhibit the change of weight over time, the dynamic load may be determined during lateral motion of the vehicle, e.g. during the cornering of the vehicle. For example, the following expression may be used:

$$w.t=(W\cdot Ay\cdot h)/t$$

wherein w.t is weight transfer, Ay is lateral acceleration of the vehicle, h is the height of the center of mass of the vehicle and t is the track width. The weight may be determined using functions c1(m) and c2(m) and the following expressions:

$$r1+yaw\cdot wb/2-w.t\cdot c(m)=r2-yaw\cdot wb/2+w.t\cdot c2(m)$$

$$r1+yaw\cdot (w.b)/2-w.t\cdot c1(m)=r2+yaw\cdot (w.b)/2+w.t\cdot c2(m)$$

wherein r1 is the radius of the outer tire (e.g., outer with respect to the cornering or turning curve), r2 is the radius of the inner tire (e.g., inner with respect to the cornering or turning curve), c1 is the deflection of the outer tire (e.g., outer with respect to the cornering or turning curve), c2 is the deflection of the inner tire (e.g., inner with respect to the cornering or turning curve), wb is the wheel base of the vehicle, and yaw is the yaw rate of the cornering, and wherein c1 and c2 may be linear or a higher dimension functions. After measuring these relationships in different points (e.g., different measuring points or segments during the cornering maneuver), functions c1 and c2 can be determined (e.g., using a machine learning model, e.g. a model similar to machine learning model 150 described hereinabove and/or any other suitable machine learning model) and the normalized rolling radius may be determined even without static load change.

Slip 1125 of the tire may be determined based on the speed of vehicle 100 (e.g., that may be determined based on geolocation 1114 and/or data from geolocation sensors 135), the effective rolling radius of the tire, rotational speed of the tire (e.g., received from wheel speed sensors 131). For example, slip 1125 of the tire may be expressed by:

Slip=(Vehicle_velocity−Effective rolling radius×rotational_speed)/Vehicle_velocity.

Friction 1126 of the tire may be determined based on slip 1125 of the tire and torque 1124 acting on the tire. Determination of friction 1126 of the tire may be important, e.g., for verification that the change in the normalized stiffness of the tire is due to wear of the tire (e.g., as described above with respect to FIG. 1) and not due to reduced friction of the tire with the road (e.g., due to a wet road). For example, different ratio values of slip 1125 over torque 1124 may be collected and stored in the memory. If different ranges of the ratio values are detected in close proximity of time (e.g., time in which the tire cannot rapidly change its parameters and has constant (or substantially constant) temperature), two extreme stiffness curves may be built (e.g., one for low friction scenario and one for high friction scenario). This process may be repeated, and the stiffness curves may be updated during the lifetime of the tire. If a sudden change in the normalized stiffness of the tire is detected, friction 1126 of the tire may be used to verify whether the change is due to the wear of the tire or due to low frequency acting on the tire (e.g., due to a wet road). For example, if it is sudden change in the normalized stiffness of the tire is detected and friction 1126 of the tire is below a predefined threshold, it may be determined that the change in the normalized stiffness of the tire is due to wet road and/or any other suitable reason but not due to the wear of the tire. In the same example, if it is sudden change in the normalized stiffness of the tire is detected and friction 1126 of the tire is above the predefined threshold, it may be determined that the change in the normalized stiffness of the tire is due to the wear of the tire.

Figure 12:
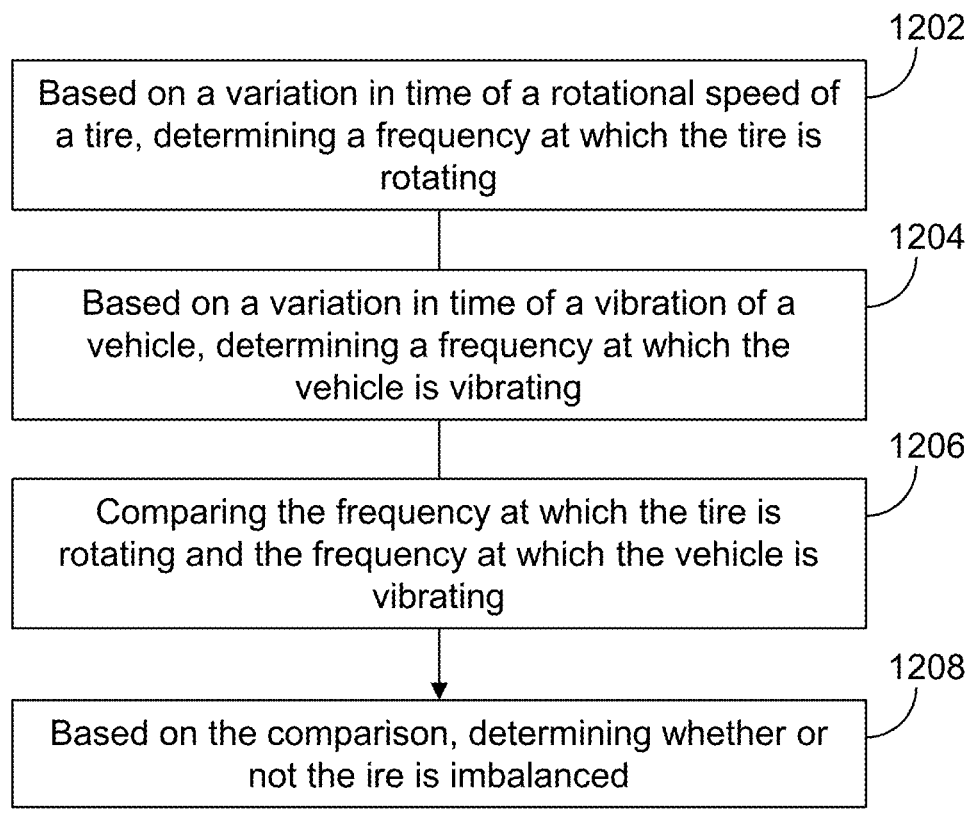
FIG. 12 is a flowchart of a method of determining whether or not the tire is imbalanced, according to some embodiments of the invention.

Reference is made to FIG. 12, which is a flowchart of a method of determining whether or not the tire is imbalanced, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 1121202, based on a variation in time of a rotational speed of a tire, determining a frequency at which the tire is rotating. The variation in time of the rotational speed of the tire may be determined from signals from a wheel speed sensor (such as wheel speed sensor 131 described above with respect to FIG. 11) of the vehicle (e.g., such as vehicle 100 described above with respect to FIG. 1). The frequency at which the tire is rotating may be determined by applying a frequency domain transform such as Fast Fourier Transform (FFT) or any other suitable frequency domain transform.

In operation 1204, based on a variation in time of a vibration of a vehicle, determining a frequency at which the vehicle is vibrating. The variation in time of the vibration of the vehicle may be determined from signals from one or more vibrational sensors of the vehicle (e.g., which may be part of sensors 130 described above with respect to FIG. 1). The frequency at which the vehicle is vibrating may be determined by applying a frequency domain transform such as Fast Fourier Transform (FFT) or any other suitable frequency domain transform.

In operation 1206, the frequency at which the tire is rotating and the frequency at which the vehicle is vibrating may be compared.

In operation 1208, based on the comparison, it may be determined whether or not the tire is imbalanced. If it is determined that the frequency at which the tire is rotating and the frequency at which the vehicle is vibrating is the same (or substantially the same), it may be determined that the tire is imbalanced. If it is determined that the frequency at which the tire is rotating and the frequency at which the vehicle is vibrating are different, it may be determined that the tire is balanced.

Based on the magnitude of the frequency at which the tire is rotating and/or the magnitude of the frequency at which the vehicle is vibrating, the imbalance value of the tire may be determined. For example, the greater the magnitude of the frequencies, the greater the imbalance value of the tire.

Based on multiplications of the frequency at which the tire is rotating (e.g., harmonics), the type of the imbalance of the tire may be determined. For example, in the case of a wobble type of the imbalance, a phase shift between vibrations at different harmonics and/or amplification of the magnitude at the wobble frequencies may be detected.

The indication of the imbalance of the tire and/or the imbalance value of the tire may be used for determining the irregular wear type and/or the irregular wear value of the tire (e.g., as described above with respect to FIGS. 1 and 3A-3B).

Figure 13:
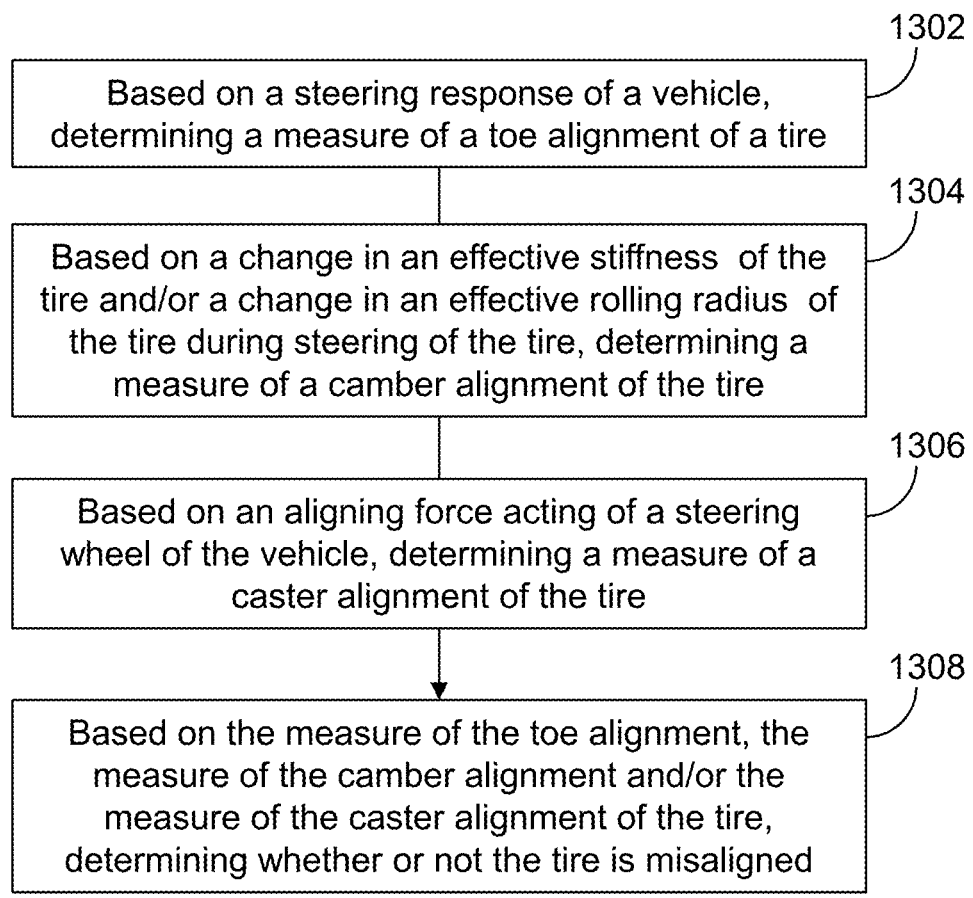
FIG. 13 is a flowchart of a method of determining whether or not a tire is misaligned, according to some embodiments of the invention.

Reference is made to FIG. 13, which is a flowchart of a method of determining whether or not a tire is misaligned, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 1302, based on a steering response of a vehicle, a measure of a toe alignment of a tire may be determined (e.g., such as vehicle 100 described above with respect to FIG. 1). The steering response may be determined based on signals from steering sensors and/or yaw sensors (e.g., which may be part of sensor 130 of vehicle 100 described above with respect to FIG. 1). For example, if the toe of the vehicle is misaligned, the vehicle may pull to one side and in order to drive the vehicle in a straight line the vehicle need to be steered to the opposite side (e.g., which can be determined based on signals from steering sensors and/or yaw sensors. In another example, if the toe of the vehicle is misaligned, the vehicle may exhibit changes in cornering/turning behavior/response. For example, a toe aligned vehicle may need 10 degrees of steering to turn at 0.2 rad/sec while toe misaligned vehicle may need 15 degrees of steering to turn at 0.2 rad/sec.

In operation 1304, based on a change in an effective stiffness of the tire and/or a change in an effective rolling radius of the tire during steering of the tire, a measure of a camber alignment of the tire may be determined. The effective rolling radius of the tire may be determined based on velocity of the vehicle, the rotational speed of the tire and known nominal dimensions of the tire. The effective stiffness of the tire may be determined based on the torque force acting on the tire over the slip of the tire. Different camber angles may cause different contact patches of the tire with the ground. For example, increase of the effective stiffness of the tire and decrease of the effective rolling radius of the tire decreases over time may be indicative of increase in the camber angle. The camber misalignment may be determined by, for example, monitoring the parameters during different driving scenarios (e.g., driving along straight line, cornering, etc.)

In operation 1306, based on an aligning force acting of a steering wheel of the vehicle, a measure of a caster alignment of the tire may be determined. For example, for caster aligned vehicle a self-aligning torque for a certain steering angle may be 30 N-m while for caster misaligned vehicle (e.g., low caster) the self-aligning torque for the same certain steering angle may be 20 N-m.

In operation 1308, based on the measure of the toe alignment, the measure of the camber alignment and/or the measure of the caster alignment of the tire, it may be determined whether or not the tire is misaligned. If it is determined that the tire is misaligned, the type of the misalignment and/or the misalignment value of the tire may be determined.

The indication of the misalignment of the tire, the type of the misalignment of the tire and/or the misalignment value of the tire may be used for determining the irregular wear type and/or the irregular wear value of the tire (e.g., as described above with respect to FIGS. 1 and 3A-3B).

Figures 14A, 14B:
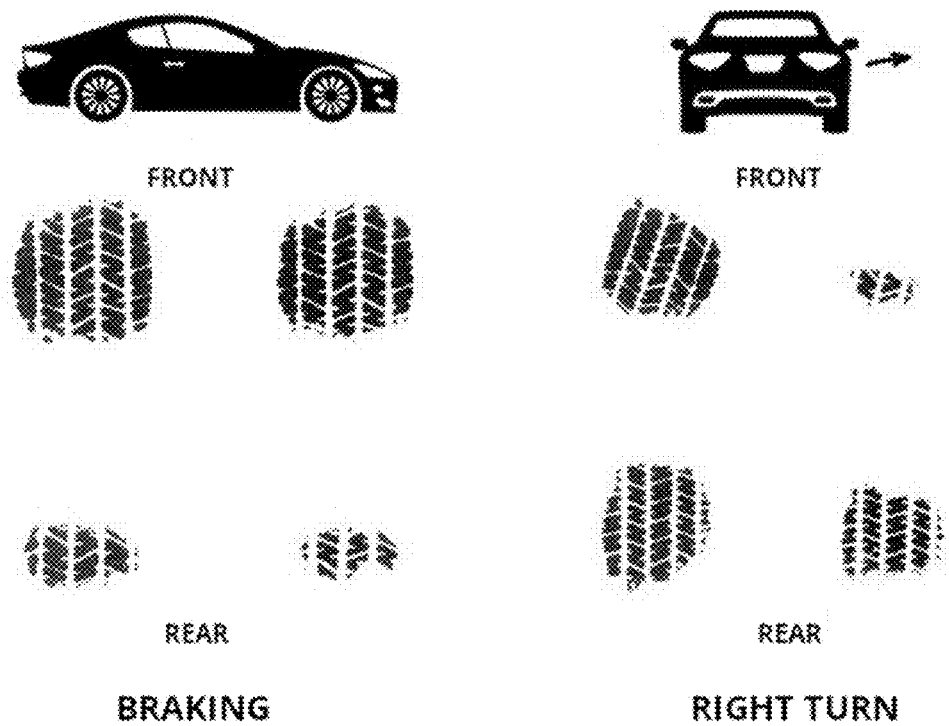
FIGS. 14A and 14B are schematic illustrations of examples of contact patch profiles of tires during braking and right turning of the vehicle, respectively.

Reference is made to FIGS. 14A and 14B, which are schematic illustrations of examples of contact patch profiles of tires during braking and right turning of the vehicle, respectively.

In different maneuvers (e.g., driving scenarios) such as turning left/right, constant speed driving and/or longitudinal acceleration/deceleration, different portions of the tires contact the road. For example, FIGS. 14A and 14B show that during braking (e.g., longitudinal deceleration) and turning right different portions of the tires of the vehicle contact the road.

In order to determine the wear (e.g., the average wear measure and/or the irregular wear type and/or the irregular wear value) of each tire of tires 120 of vehicle 100, the respective tire may be divided into a plurality of sections. The determination of the wear may be performed by processor 142 of computing device 140 disposed on vehicle 100 and/or processor 192 of remote computing device 190 (e.g., as described above with respect to FIG. 1). The contribution of each section of the plurality of sections of each tire of tires 120 to the effective rolling radius of the respective tire during each maneuver of the plurality of maneuvers may be determined using a dynamic equation of a plurality of dynamic equations of vehicle 100 based on the weight of vehicle 100, cog height of vehicle 100 and/or tires alignment configuration of vehicle 100. Based on the change in the effective rolling radius of each tire of tires 120 of vehicle 100 over a period of time, the wear (e.g., the average wear measure and/or the irregular wear type and/or the irregular wear value) of the respective tire may be determined.

Figure 14C:
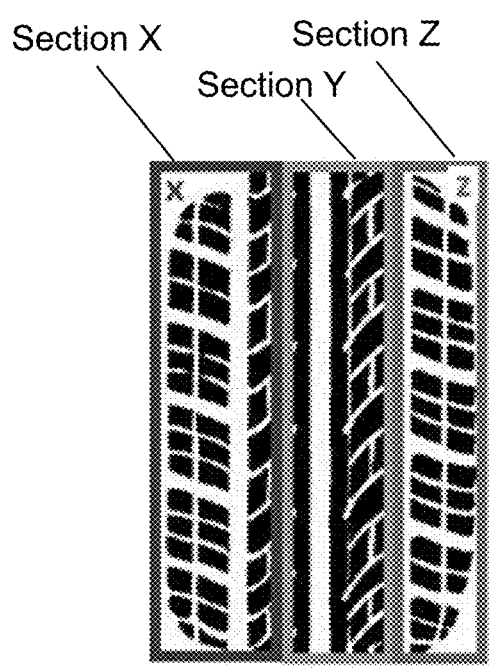
FIG. 14C is a schematic illustration of a tire of the tires of the vehicle divided into a plurality of sections for determination of the wear of the tire, according to some embodiments of the invention.

Reference is made to FIG. 14C, which is a schematic illustration of a tire 121 of tires 120 of vehicle 100 divided into a plurality of sections for determination of the wear of the tire, according to some embodiments of the invention.

In FIG. 14C, tire 121 is divided into three sections X, Y, Z. However, tire 121 may be divided into any suitable number of sections, for example two sections or four and more sections. Greater number of sections may provide more accurate determination of the wear of the tire. The contribution of each section of sections X, Y, Z of tire 121 to the effective rolling radius of tire 121 during each maneuver of the plurality of maneuvers may be determined using a dynamic equation of a plurality of dynamic equations.

For example, the contribution of each of sections X, Y, Z of tire 121 to the effective rolling radius of tire 121 during straight driving may be provided by a first dynamic equation:

$$\text{Effective\_Rolling\_Radius\_1} = AxX + BxY + CxZ;$$

the contribution of each of sections X, Y, Z of tire 121 to the effective rolling radius of tire 121 during turning right may be provided by a second dynamic equation:

$$\text{Effective\_Rolling\_Radius\_2} = DxX + ExY + FxZ;$$

wherein coefficients A, B, C, D, E and F may be determined based on the weight of vehicle 100, cog height of vehicle 100 and/or tires alignment configuration of vehicle 100. More dynamic equations for more driving maneuvers may be provided.

By solving the dynamic equations, the effective rolling radius of tire 121 may be determined. Based on the change in the effective rolling radius of each tire of tires 120 of vehicle 100 over a period of time, the wear e.g., the average wear measure and/or the irregular wear type and/or the irregular wear value) may be determined. Such operations may be performed for each tire of tires 120 of vehicle 100.

Figure 14D:
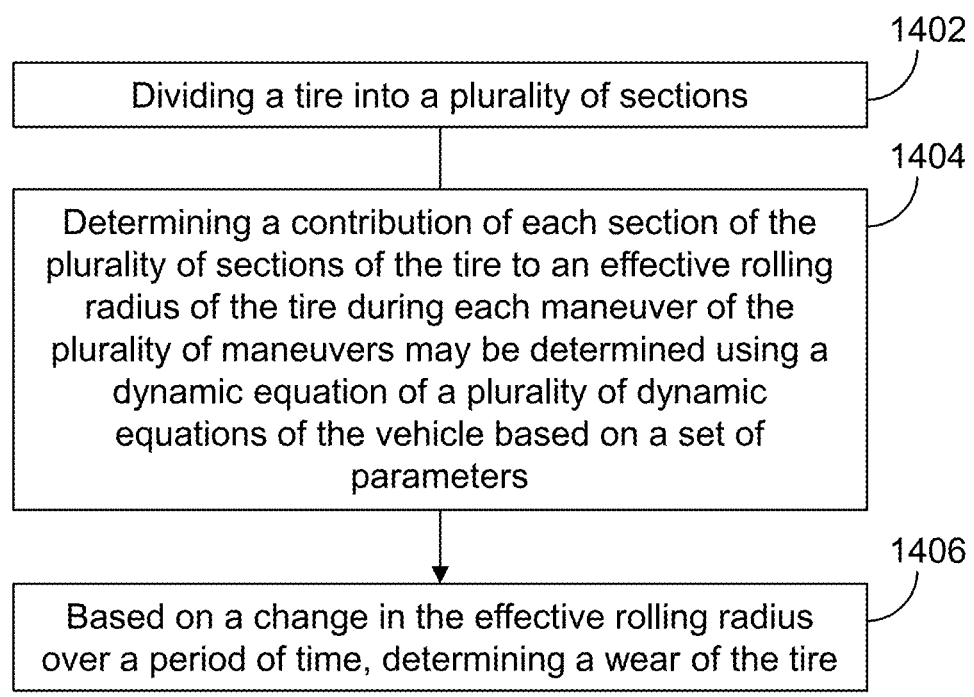
FIG. 14D is a flowchart of a method of determining the wear of the tire of the vehicle, according to some embodiments of the invention.

Reference is made to FIG. 14D, which is a flowchart of a method of determining the wear of the tire of the vehicle, according to some embodiments of the invention.

The operations described hereinbelow may be performed by a processor such as processor 142 of computing device 140 disposed on vehicle 100, a processor 192 of a remote computing device and/or any suitable computing device. The operations described hereinbelow may be performed for each tire of tires 120 of vehicle 100.

In operation 1402, the tire may be divided into a plurality of sections (e.g., as described above with respect to FIGS. 14A, 14B and 14C).

In operation 1404, a contribution of each section of the plurality of sections of the tire to an effective rolling radius of the tire during each maneuver of the plurality of maneuvers may be determined using a dynamic equation of a plurality of dynamic equations of the vehicle based on a set of parameters (e.g., as described above with respect to FIGS. 14A, 14B and 14C). The set of parameters may, for example, include the weight of the vehicle, the cog height of the vehicle and/or the tires alignment configuration of the vehicle.

In operation 1406, based on the change in the effective rolling radius of the tire over a period of time, the wear (e.g., the average wear measure and/or the irregular wear type and/or the irregular wear value) of the tire may be determined (e.g., as described above with respect to FIGS. 14A, 14B and 14C).

Figure 15:
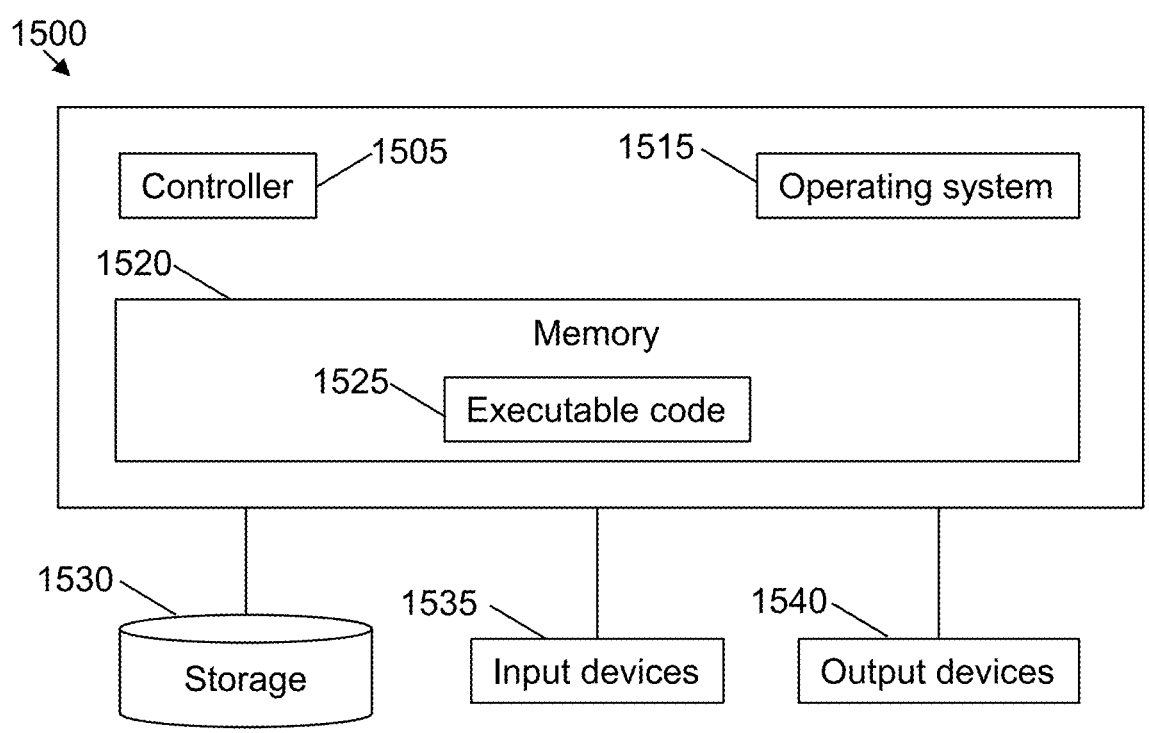
FIG. 15 is a block diagram of an exemplary computing device which may be used with embodiments of the present invention.

Reference is made to FIG. 15, which is a block diagram of an exemplary computing device which may be used with embodiments of the present invention.

Computing device 1500 may include a controller or processor 1505 that may be, for example, a central processing unit processor (CPU), a chip or any suitable computing or computational device, an operating system 1515, a memory 1520, a storage 1530, input devices 1535 and output devices 1540.

Operating system 1515 may be or may include any code segment designed and/or configured to perform tasks involving coordination, scheduling, arbitration, supervising, controlling or otherwise managing operation of computing device 1500, for example, scheduling execution of programs. Memory 1520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1520 may be or may include a plurality of, possibly different, memory units. Memory 1520 may store for example, instructions to carry out a method (e.g., code 1525), and/or data such as user responses, interruptions, etc.

Executable code 1525 may be any executable code, e.g., an application, a program, a process, task or script. Executable code 1525 may be executed by controller 1505 possibly under control of operating system 1515. In some embodiments, more than one computing device 1500 or components of device 1500 may be used for multiple functions described herein. For the various modules and functions described herein, one or more computing devices 1500 or components of computing device 1500 may be used. Devices that include components similar or different to those included in computing device 1500 may be used, and may be connected to a network and used as a system. One or more processor(s) 1505 may be configured to carry out embodiments of the present invention by for example executing software or code. Storage 1530 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 1535 may be or may include a mouse, a keyboard, a touch screen or pad or any suitable input device. It will be recognized that any suitable number of input devices may be operatively connected to computing device 1500 as shown by block 1535. Output devices 1540 may include one or more displays, speakers and/or any other suitable output devices. It will be recognized that any suitable number of output devices may be operatively connected to computing device 1500 as shown by block 1540. Any applicable input/output (I/O) devices may be connected to computing device 1500, for example, a wired or wireless network interface card (NIC), a modem, printer or facsimile machine, a universal serial bus (USB) device or external hard drive may be included in input devices 1535 and/or output devices 1540.

Embodiments of the invention may include one or more article(s) (e.g., memory 1520 or storage 1530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In some embodiments, some of the components shown in FIG. 15 may be omitted.

Figure 16:
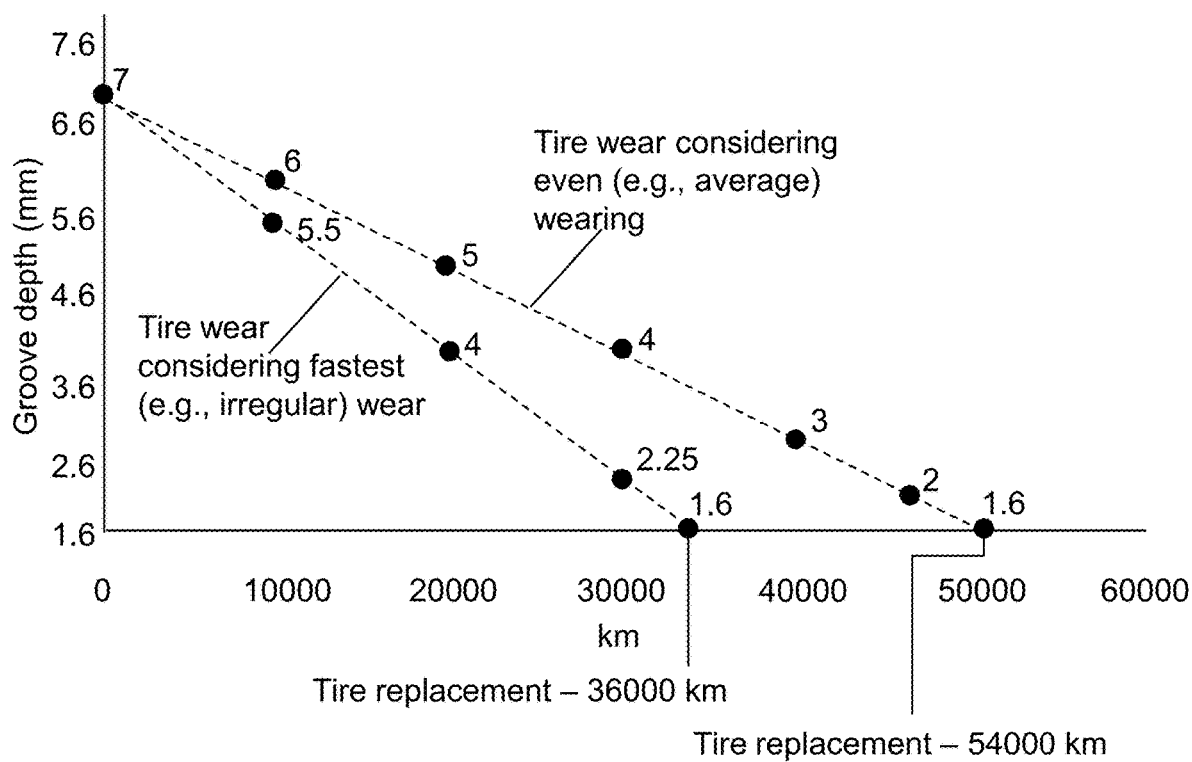
FIG. 16 is a graph showing the difference between the average wear and the irregular wear of the tire, according to some embodiments of the invention.

Reference is made to FIG. 16, which is a graph showing the difference between the average wear and the irregular wear of the tire, according to some embodiments of the invention.

The average wear of the tire may be indicative of the overall rate at which the entire tread of the tire loses material over time. The average wear of the tire may be indicative of the reduction in tread depth across all grooves of the tire at regular intervals. The irregular wear of the tire may be indicative of the wear in the specific area or groove within the tire tread which experiences the most rapid wear. Tire removal regulations in different countries may use irregular wear as the primary factor for determining when the tire should be replaced.

When a tire is optimally designed and used under ideal conditions, the life expectancy of the tire based on both the average wear and irregular wear of the tire may be substantially similar. If the average wear and irregular wear values are close to each other, it may indicate regular (even) wear of the tire. A significant difference between the average wear value and irregular wear value may indicate increasing levels of irregular (e.g., uneven) wear of the tire.

For example, a tire may have 5 grooves, each starting at 7 mm in depth. After 10,000 km, each groove is reduced by 1 mm, resulting in an average groove depth of 6 mm and a wear rate of 10,000 km per 1 mm. Since the fastest-wearing groove equals the average wear per groove, the tire has worn regularly (e.g., evenly). If the wear rate is consistent (e.g., even) throughout the tire's life and it is removed at the legal limit of 1.6 mm, the tire lasts 54,000 km. Using the same tire, assuming, for example a misalignment causes sloped wear across the grooves, after 10,000 km the depth of groove 1 is 0.5 mm, the depth of groove 2 is 0.75 mm, the depth of groove 3 is 1 mm, the depth of groove 4 is 1.25 mm and the depth of groove 5 is 1.5 mm. The average groove depth is still 6 mm, with an average wear rate of 10,000 km per 1 mm. However, considering the fastest-wearing groove (e.g., in the case of irregular wear), the wear rate reduces to 6,667 km per 1 mm, leading to a potential lifespan of only 36,000 km.

The Table below and the graph in FIG. 16 summarize the difference between the regular groove wear (e.g., average wear) and the fastest-wearing groove wear (e.g., irregular wear), highlighting the impact of the irregular wear on tire performance and lifespan of the tire. In this particular example, if the average wear and the fastest groove (e.g., irregular) wear are the same, the tire removal (e.g., replacement) mileage is 54,000 km, while if fastest groove (e.g., irregular) wear is significantly different from the average wear, the tire removal (e.g., replacement) mileage is 36,000 km.

| Wear type | Total km | Groove 1 | Groove 2 | Groove 3 | Groove 4 | Groove 5 | Average wear | Useable pattern depth 7-1.6 mm | Average wear km per mm | Removal km | Maximum wear | Useable Pattern depth 7-16 mm | Maximum wear km per mm | Removal km |
|---|---|---|---|---|---|---|---|---|---|---|---|---|---|---|
| Regular wear | 10000 | 1 | 1 | 1 | 1 | 1 | 1 | 5.4 | 10000 | 54000 | 1 | 5.4 | 10000 | 54000 |
| Irregular wear | 10000 | 0.5 | 0.75 | 1 | 1.25 | 1.25 | 1 | 5.4 | 10000 | 54000 | 1.5 | 5.4 | 6667 | 36000 |

Using average wear to determine final tire removal (e. g., replacement) kilometers may be not an accurate measure in some cases. In both examples above, the average wear suggested a removal mileage of 54,000 km. However, considering the fastest groove (e.g., irregular) wear, the irregularly worn tire should be removed at 36,000 km, demonstrating that the fast groove wear (e.g., irregular wear) may be, in some embodiments, a more reliable indicator for tire replacement.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of determining the wear of a tire, the method comprising, using a computing device operating a processor:
obtaining, in real time, during a ride of a vehicle, signals from sensors of the vehicle, the sensors comprising a wheel speed sensor, a pressure sensor and a torque sensor;
based on the signals, determining, in real time, during the ride of the vehicle, a plurality of tire parameters of a tire, the tire parameters comprising a load acting on the tire, a rotational speed of the tire and a pressure within the tire;
based on at least a portion of the tire parameters, determining, in real time, during the ride of the vehicle, a normalized rolling radius of the tire, the normalized rolling radius being an effective rolling radius of the tire under a zero rotational speed, a zero load or both;
based on a change in the normalized rolling radius of the tire over a period of time, determining, in real time, during the ride of the vehicle, an average wear value of the tire; and
transmitting, in real time, during the ride of the vehicle, the average wear value to at least one of a braking unit, a motor, a steering unit and a suspension unit of the vehicle for adapting operation of the at least one of the braking unit, the motor, the steering unit and the suspension unit according to the average wear value of the tire.

2. The method of claim 1, wherein determining the normalized rolling radius of the tire comprises providing at least a portion of the tire parameters as an input into a machine learning model.

3. The method of claim 2, comprising:
based on the signals, generating, in real time, during the ride of the vehicle, training datasets for training the machine learning model, each of the training datasets comprising the tire parameters labeled with a reference effective rolling radius value; and
training, in real time, during the ride of the vehicle, the machine learning model based on the training datasets such that the machine learning model learns to normalize an effect of the tire parameters on the effective rolling radius of the tire.

4. The method of claim 1, comprising:
based on a change in the normalized rolling radius of the tire, determining that the tire has been replaced with the new tire; and
if it is determined that the tire has been replaced with the new tire, resetting the tire parameters determined for the tire.

5. A method of determining the wear of a tire, the method comprising, using a computing device operating a processor:
obtaining, in real time, during a ride of a vehicle, signals from sensors of the vehicle, the sensors comprising a wheel speed sensor, a pressure sensor and a torque sensor;
based on the signals, determining, in real time, during the ride of the vehicle, a plurality of tire parameters of a tire, the tire parameters comprising a load acting on the tire, a rotational speed of the tire and a pressure within the tire;
based on at least a portion of the tire parameters, determining, in real time, during the ride of the vehicle, a normalized rolling radius of the tire, the normalized rolling radius being an effective rolling radius of the tire under a zero rotational speed, a zero load or both;
based on a change in the normalized rolling radius of the tire over a period of time, determining, in real time, during the ride of the vehicle, an average wear value of the tire; and
controlling, in real time, during the ride of the vehicle, at least one of a braking unit, a motor, a steering unit and a suspension unit of the vehicle based on the average wear value to adapt operation of the at least one of the braking unit, the motor, the steering unit and the suspension unit according to the average wear value of the tire.

6. A method of determining the wear of a tire, the method comprising, using a computing device operating a processor:

obtaining, in real time, during a ride of a vehicle, signals from sensors of the vehicle, the sensors comprising a wheel speed sensor, a pressure sensor and a torque sensor;

based on the signals, determining, in real time, during the ride of the vehicle, a plurality of tire parameters of a tire, the tire parameters comprising a load acting on the tire, a rotational speed of the tire and a pressure within the tire;

based on at least a portion of the tire parameters, determining, in real time, during the ride of the vehicle, a normalized rolling radius of the tire, the normalized rolling radius being an effective rolling radius of the tire under a zero rotational speed, a zero load or both;

based on a change in the normalized rolling radius of the tire over a period of time, determining, in real time, during the ride of the vehicle, an average wear value of the tire; and transmitting, in real time, during the ride of the vehicle, the average wear value to at least one advanced driver assistance system of the vehicle for adapting operation of the at least one advanced driver assistance system according to the average wear value of the tire.

7. A method of determining a wear of a tire, the method comprising, using a computing device operating a processor:

obtaining, in real time, during a ride of a vehicle, signals from sensors of the vehicle, the sensors comprising a wheel speed sensor, a pressure sensor and a torque sensor;

based on the signals, determining, in real time, during the ride of the vehicle, a plurality of tire parameters of a tire, the tire parameters comprising a load acting on the tire, a rotational speed of the tire, a pressure within the tire, a torque acting on the tire and a slip of the tire;

based on at least a portion of the tire parameters, determining, in real time, during the ride of the vehicle:

a normalized rolling radius of the tire, the normalized rolling radius being an effective rolling radius of the tire under a zero rotational speed, a zero load or both, and a normalized stiffness of the tire, the normalized stiffness of the tire being an effective stiffness of the tire under a zero torque;

based on a change in the normalized rolling radius and a change in the normalized stiffness of the tire over a period of time, determining, in real time, during the ride of the vehicle, at least one of an irregular wear type of the tire and an irregular wear value of the tire; and transmitting, in real time, during the ride of the vehicle, at least one of the irregular wear type of the tire and the irregular wear value of the tire to at least one of a braking unit, a motor, a steering unit and a suspension unit of the vehicle for adapting operation of the at least one of the braking unit, the motor, the steering unit and the suspension unit according to the at least one of the irregular wear type of the tire and the irregular wear value of the tire.

8. The method of claim 7, wherein determining the normalized rolling radius and the normalized stiffness of the tire comprises providing at least a portion of the tire parameters as an input into a machine learning model.

9. The method of claim 8, comprising:

based on the signals, generating, in real time, during the ride of the vehicle, training datasets for training the machine learning model, each of the training datasets comprising the tire parameters labeled with a reference effective rolling radius value; and training, in real time, during the ride of the vehicle, the machine learning model based on the training datasets such that the machine learning model learns to normalize an effect of the tire parameters on the effective rolling radius of the tire and the effective stiffness of the tire.

10. The method of claim 7, wherein determining at least one of the irregular wear type of the tire and the irregular wear value of the tire comprises providing at least a portion of the tire parameters as an input into a machine learning model.

11. The method of claim 10, comprising training the machine learning model based on training datasets comprising the changes of the normalized rolling radius and the normalized stiffness of the tire labeled with at least one of reference irregular wear types and reference irregular wear values.

12. The method of claim 7, comprising:

based on the signals, determining at least one of an indication that the tire is imbalanced and an imbalance value of the tire; and further based on at least one of the indication that the tire is imbalanced and the imbalance value of the tire, determining at least one of the irregular wear type of the tire and the irregular wear value of the tire.

13. The method of claim 7, comprising:

based on the signals, determining at least one of an indication that the tire is misaligned and a misalignment value of the tire; and further based on at least one of the indication that the tire is misaligned and the misalignment value of the tire, determining at least one of the irregular wear type of the tire and the irregular wear value of the tire.

14. The method of claim 7, comprising:

based on at least one of a change in the normalized rolling radius and a change of the normalized stiffness of the tire, determining that the tire has been replaced with the new tire; and if it is determined that the tire has been replaced with the new tire, resetting the tire parameters determined for the tire.

15. A method of determining a wear of a tire, the method comprising, using a computing device operating a processor:

obtaining, in real time, during a ride of a vehicle, signals from sensors of the vehicle, the sensors comprising a wheel speed sensor, a pressure sensor and a torque sensor;

based on the signals, determining, in real time, during the ride of the vehicle, a plurality of tire parameters of a tire, the tire parameters comprising a load acting on the tire, a rotational speed of the tire, a pressure within the tire, a torque acting on the tire and a slip of the tire;

based on at least a portion of the tire parameters, determining, in real time, during the ride of the vehicle:

a normalized rolling radius of the tire, the normalized rolling radius being an effective rolling radius of the tire under a zero rotational speed, a zero load or both, and a normalized stiffness of the tire, the normalized stiffness of the tire being an effective stiffness of the tire under a zero torque;

based on a change in the normalized rolling radius and a change in the normalized stiffness of the tire over a period of time, determining, in real time, during the ride of the vehicle, at least one of an irregular wear type of the tire and an irregular wear value of the tire; and controlling, in real time, during the ride of the vehicle, at least one of a braking unit, a motor, a steering unit and a suspension unit of the vehicle based on the average wear value to adapt operation of the at least one of the braking unit, the motor, the steering unit and the suspension unit according to at least one of the irregular wear type of the tire and the irregular wear value of the tire.

16. A method of determining a wear of a tire, the method comprising, using a computing device operating a processor:
obtaining, in real time, during a ride of a vehicle, signals from sensors of the vehicle, the sensors comprising a wheel speed sensor, a pressure sensor and a torque sensor;
based on the signals, determining, in real time, during the ride of the vehicle, a plurality of tire parameters of a tire, the tire parameters comprising a load acting on the tire, a rotational speed of the tire, a pressure within the tire, a torque acting on the tire and a slip of the tire;
based on at least a portion of the tire parameters, determining, in real time, during the ride of the vehicle:
  a normalized rolling radius of the tire, the normalized rolling radius being an effective rolling radius of the tire under a zero rotational speed, a zero load or both, and
  a normalized stiffness of the tire, the normalized stiffness of the tire being an effective stiffness of the tire under a zero torque;
based on a change in the normalized rolling radius and a change in the normalized stiffness of the tire over a period of time, determining, in real time, during the ride of the vehicle, at least one of an irregular wear type of the tire and an irregular wear value of the tire; and
transmitting, in real time, during the ride of the vehicle, at least one of the irregular wear type of the tire and the irregular wear value of the tire to at least one advanced driver assistance system of the vehicle for adapting operation of the at least one advanced driver assistance system according to the at least one of the irregular wear type of the tire and the irregular wear value of the tire.

* * * * *